US012718647B2

(12) United States Patent
Sakamoto et al.

(10) Patent No.: US 12,718,647 B2
(45) Date of Patent: Aug. 25, 2026

(54) METHOD FOR CONTROLLING BANKNOTE PROCESSING DEVICE, AND BANKNOTE PROCESSING DEVICE

(71) Applicant: GLORY LTD., Himeji (JP)

(72) Inventors: Masao Sakamoto, Himeji (JP); Tsuyoshi Izumida, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 19/269,036

(22) Filed: Jul. 15, 2025

(65) Prior Publication Data

US 2025/0342741 A1 Nov. 6, 2025

Related U.S. Application Data

(63) Continuation of application No. PCT/JP2024/000666, filed on Jan. 12, 2024.

(30) Foreign Application Priority Data

Jan. 19, 2023 (JP) ................................ 2023-006569

(51) Int. Cl.
*G07D 11/18* (2019.01)
*G07D 11/16* (2019.01)
*G07D 11/235* (2019.01)
*G07D 11/25* (2019.01)

(52) U.S. Cl.
CPC ........... *G07D 11/235* (2019.01); *G07D 11/16* (2019.01); *G07D 11/25* (2019.01)

(58) Field of Classification Search
CPC ...... G07D 11/235; G07D 11/16; G07D 11/25; G07D 11/18; G07D 11/20; G07D 11/24; G07D 11/34
See application file for complete search history.

(56) References Cited

U.S. PATENT DOCUMENTS

| | | | |
|---|---|---|---|
| 9,342,942 B2 | 5/2016 | Yoon et al. | |
| 2012/0273321 A1 | 11/2012 | Miki et al. | |
| 2018/0040187 A1* | 2/2018 | Jeong .................. | G07D 11/125 |

FOREIGN PATENT DOCUMENTS

| | | |
|---|---|---|
| JP | 2014-085783 A | 5/2014 |
| WO | 2011/036764 A1 | 3/2011 |

OTHER PUBLICATIONS

International Search Report and Written Opinion mailed on Feb. 27, 2024, received for PCT Application PCT/JP2024/000666, filed on Jan. 12, 2024, 8 pages including English Translation.

* cited by examiner

*Primary Examiner* — Jamara A Franklin
(74) *Attorney, Agent, or Firm* — XSENSUS LLP

(57) ABSTRACT

A method for controlling a banknote processing device is a method in which in dispensing transaction, a storage feeds out banknotes; a recognition circuit recognizes the banknotes fed out from the storage; a conveyor transports banknotes recognized as non-rejected banknotes by the recognition circuit to an outlet, and transports banknotes recognized as rejected banknotes by the recognition circuit to a temporary storage; the temporary storage stores the rejected banknotes; if the temporary storage stores the rejected banknotes, in the dispensing transaction, the temporary storage feeds out the rejected banknotes as banknotes used for the dispensing transaction; and the conveyor transports the banknotes fed out from the temporary storage to the outlet.

13 Claims, 11 Drawing Sheets

METHOD FOR CONTROLLING BANKNOTE PROCESSING DEVICE, AND BANKNOTE PROCESSING DEVICE

CROSS-REFERENCE TO RELATED APPLICATIONS

This application is a bypass continuation of International Patent Cooperation Treaty Application No. PCT/JP2024/000666 filed on Jan. 12, 2024, and Japanese Patent Application No. 2023-006569 filed on Jan. 19, 2023, the entire disclosures of each are incorporated herein by reference.

BACKGROUND

The present disclosure relates to a method for controlling a banknote processing device and the banknote processing device.

A conventional automatic teller machine (ATM) conducts the dispensing transaction. A banknote cassette feeds out banknotes in the dispensing transaction. Among the banknotes fed out from the banknote cassette, the rejected banknotes are stored in a reject box instead of being dispensed to the outside of the ATM. For example, the rejected banknotes are a plurality of overlapped banknotes and/or banknotes significantly angled off the transport direction.

SUMMARY

The technology disclosed herein relates to a method for controlling a banknote processing device. In this method, in dispensing transaction, a storage feeds out banknotes used for the dispensing transaction; a recognition circuit recognizes the banknotes fed out from the storage; a conveyor transports banknotes recognized as non-rejected banknotes by the recognition circuit to an outlet, and transports banknotes recognized as rejected banknotes by the recognition circuit to a temporary storage; the temporary storage stores the rejected banknotes; in a case where the temporary storage stores the rejected banknotes, in the dispensing transaction, the temporary storage feeds out the rejected banknotes as banknotes used for the dispensing transaction; and the conveyor transports the banknotes fed out from the temporary storage to the outlet.

DETAILED DESCRIPTION OF THE DRAWINGS

Figure 1:
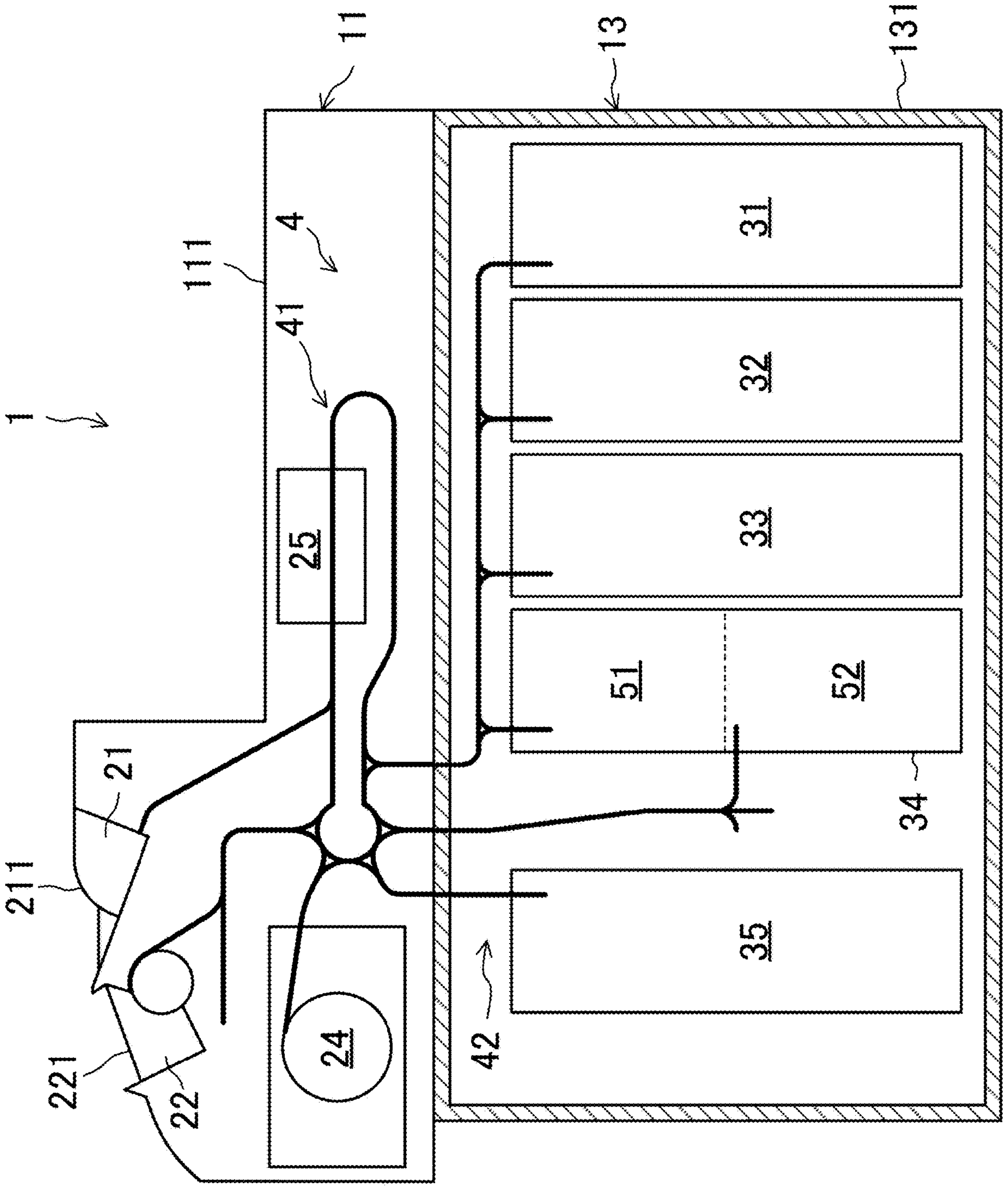
FIG. 1 shows a configuration of a banknote processing device.

A conventional banknote processing device stores a rejected banknote in a reject box that occurred in the dispensing transaction. The reject box full of banknotes cannot store extra rejected banknotes. If the reject box becomes full of banknotes, the banknote processing device shuts down because it cannot execute the dispensing transaction. If the box has a larger capacity, the banknote processing device shuts down less frequently. However, if the box has a large capacity, the size of the banknote processing device increases.

A person in charge with an authorization has to remove the banknotes from the box when or before the box becomes full of banknotes. Since the box has a limited capacity, the person in charge has to frequently remove the banknotes from the box.

The technique disclosed herein enables smooth operation of the banknote processing device.

A conventional banknote processing device only allows the rejected banknotes that occurred in the dispensing transaction to gradually accumulate in the device, where those banknotes do not have opportunity to be dispensed outside the device except when collected by a person in charge.

The technology disclosed herein is characterized in that a rejected banknote stored in a temporary storage unit in one dispensing transaction is fed out and dispensed in another dispensing transaction from the temporary storage unit as a banknote used for dispensing transaction. The temporary storage unit is less likely to become full of banknotes.

Specifically, the technology disclosed herein relates to a method for controlling a banknote processing device. In this method, in dispensing transaction, a storage unit feeds out banknotes used for the dispensing transaction; a recognition unit recognizes the banknotes fed out from the storage unit; a transport unit transports banknotes recognized as non-rejected banknotes by the recognition unit to an outlet, and transports banknotes recognized as rejected banknotes by the recognition unit to a temporary storage unit; the temporary storage unit stores the rejected banknotes; in a case where the temporary storage unit stores the rejected banknotes, in the dispensing transaction, the temporary storage unit feeds out the rejected banknotes as banknotes used for the dispensing transaction; and the transport unit transports the banknotes fed out from the temporary storage unit to the outlet.

For example, the "banknote processing device" may be a device installed in a financial institution and operated by customers. The banknote processing device may be a self-service machine, an ATM, or part of an ATM. The banknote processing device is not limited to being installed in financial institutions. The banknote processing device can be located in any place.

The banknote processing device is also not limited to a device operated by customers of financial institutions. The banknote processing device can also be operated by any person.

For example, the "dispensing transaction" may be transaction in which according to a user's instruction, banknotes are dispensed to the user. For example, the user may specify the amount of money to be dispensed, or may specify the denomination and number of banknotes to be dispensed.

The storage unit stores the banknotes. One storage unit may store one denomination of banknote. One storage unit may store different denominations of banknote in combination. The storage unit feeds out the banknotes used for the dispensing transaction.

The recognition unit recognizes the banknotes used for the dispensing transaction fed out from the storage unit. The recognition unit at least recognizes the denomination of banknotes, and also counts the number of banknotes. Using the information obtained by the recognition unit, the transport unit may count the number of banknotes. If a plurality of banknotes overlap each other or a banknote is significantly off-angled, the recognition unit may fail to correctly count the number of banknotes because it cannot identify the denomination of banknotes. The recognition unit recognizes those banknotes transported in the unusual manners as rejected banknote. The rejected banknotes are not limited to the banknotes transported in the unusual manners.

The transport unit transports the banknotes recognized as rejected banknotes to the temporary storage unit, and the temporary storage unit stores the rejected banknotes. The temporary storage unit may be used as a storage unit that stores the rejected banknotes that occurred in the dispensing transaction. The transport unit transports the banknote recognized as a non-rejected banknote to the outlet. The outlet holds one banknote or collects and holds a plurality of banknotes. The user picks up the banknotes through the outlet.

If the temporary storage unit stores the rejected banknotes when another dispensing transaction (a dispensing transaction different from the previous dispensing transaction) starts, the temporary storage unit feeds out the rejected banknotes as banknotes used for the dispensing transaction. The transport unit transports the banknotes fed out from the temporary storage unit to the outlet.

Unlike conventional banknote processing devices, the temporary storage unit of this banknote processing device does not solely store the rejected banknotes. The temporary storage unit feeds out the rejected banknotes, whereby the number of banknotes stored in the temporary storage unit is reduced. The temporary storage unit is less likely to become full of banknotes. If the temporary storage unit is less likely to become full of banknotes, the person in charge collects the banknotes less frequently from the temporary storage unit, and thus it is possible to conduct smooth operation of the banknote processing device. The temporary storage unit may be a drum-winding type storage unit that reels and stores the banknotes.

In a case where an amount of the rejected banknotes stored is included in an amount of banknotes to be dispensed, the temporary storage unit may feed out the rejected banknotes as banknotes used for the dispensing transaction.

The case "if an amount of the rejected banknotes stored is included in an amount of banknotes to be dispensed" means that, if the rejected banknote are transferred to the outlet as the banknotes used for the dispensing transaction, all or part of the amount of banknotes to be dispensed are covered by the rejected banknotes. That is, even if the rejected banknotes stored in the temporary storage unit are transferred to the outlet, the banknote processing device is not regarded as having dispensed excessive banknotes.

In a case where the amount of the rejected banknotes stored is not included in the amount of banknotes to be dispensed, that is, if the banknote processing device is regarded as having dispensed excessive banknotes if the rejected banknotes stored are transferred to the outlet, the temporary storage unit may not feed out the rejected banknotes even if storing the rejected banknotes. Instead of the temporary storage unit, the storage unit may feed out the stored banknotes as the banknotes used for the dispensing transaction. The banknote processing device can execute the dispensing transaction as appropriate.

In a case where a denomination and number of the rejected banknotes stored are included in a denomination and number of the banknotes to be dispensed, the temporary storage unit may feed out the rejected banknotes as banknotes used for the dispensing transaction.

The case "in a case where a denomination and number of the rejected banknotes stored are included in a denomination and number of the banknotes to be dispensed" means that, if the rejected banknote are transferred to the outlet as the banknotes used for the dispensing transaction, all or part of the banknotes to be dispensed are covered by the rejected banknotes.

The banknote processing device can execute the dispensing transaction as appropriate.

In a case where an amount of the rejected banknotes stored in the temporary storage unit is insufficient for an amount of banknotes to be dispensed, the storage unit may feed out banknotes that compensate for insufficiency.

The banknote processing device uses both the temporary storage unit and the storage unit in order to execute the dispensing transaction. The banknote processing device can transfer the rejected banknotes stored in the temporary storage unit as banknotes used for the dispensing transaction, while also transferring to the outlet the exact amount of the banknotes to be dispensed.

The temporary storage unit may distinguish and store the rejected banknotes for each dispensing transaction and may feed out the rejected banknotes for each dispensing transaction.

The temporary storage unit can store not only the rejected banknotes that occurred in one dispensing transaction but also the rejected banknotes that occurred in each of a plurality of dispensing transactions. As described later, the banknote processing device can recognize the denomination and number of rejected banknotes that occurred in each dispensing transaction.

The temporary storage unit stores the rejected banknotes for each dispensing transaction. One or more rejected banknotes that occurred in one dispensing transaction may form a group that is distinguishable from other groups in one temporary storage unit. By feeding out the rejected banknotes for each group, the temporary storage unit can feed out the rejected banknotes for each dispensing transaction. The temporary storage unit can feed out not only the rejected banknotes that occurred in one dispensing transaction but also the rejected banknotes that occurred in each of a plurality of dispensing transactions.

The temporary storage unit may feed out the rejected banknotes as banknotes used for the dispensing transaction in a case where an amount of the rejected banknotes stored in one dispensing transaction or an amount of the rejected banknotes stored over a plurality of dispensing transactions is included in an amount of banknotes to be dispensed.

The temporary storage unit feeds out a plurality of groups of the rejected banknotes instead of feeding out only one group of the rejected banknotes, whereby the number of banknotes stored in the temporary storage unit is further reduced. The person in charge collects the banknotes further less frequently from the temporary storage unit.

The temporary storage unit may be a drum-winding type storage unit and wind the rejected banknotes around the drum at intervals for each dispensing transaction.

The drum-winding type temporary storage unit can distinguish and store the rejected banknotes for each dispensing transaction by adjusting the intervals between the banknotes wound around the drum. In the temporary storage unit, a group of rejected banknotes included in one dispensing transaction is not mixed with other groups. The drum-winding type temporary storage unit can feed out the rejected banknotes for each dispensing transaction.

A memory unit may store identification numbers of the banknotes stored in the storage unit; in a case where a rejected banknote occurs, after the dispensing transaction, the storage unit may feed out part of the banknotes, and the recognition unit may read the identification numbers of the banknotes fed out from the storage unit; and a control unit may confirm an inventory amount of the storage unit based on the number of the banknotes by matching the identification numbers read by the recognition unit with the identification numbers stored in the memory unit, and confirms the number of the rejected banknotes stored in the temporary storage unit in the dispensing transaction based on the number of banknotes transferred to the outlet in the dispensing transaction and the inventory amount of the storage unit confirmed after the dispensing transaction.

The rejected banknotes that occur in the dispensing transaction may be, for example, a plurality of banknotes overlapping each other. The recognition unit cannot count the number of rejected banknotes. The control unit cannot directly count the number of rejected banknotes stored in the temporary storage unit in the dispensing transaction.

If the inventory amount of the storage unit based on the number of banknotes after the dispensing transaction is confirmed, the control unit can confirm the number of banknotes fed out from the storage unit in the dispensing transaction based on the difference between the inventory amount before the dispensing transaction and inventory amount after the dispensing transaction. The banknotes fed out from the storage unit include the banknotes fed out to the outlet and the rejected banknotes stored in the temporary storage unit. Since the number of banknotes transferred to the outlet is known, the control unit can confirm the number of rejected banknotes stored in the temporary storage unit.

The memory unit storing the identification numbers of the banknotes in the order in which the banknotes are stored enables quick confirmation of the inventory amount of the storage unit. That is, the inventory amount of the banknotes stored in the storage unit is confirmed if the memory unit stores the identification numbers of the banknotes stored in the storage unit in the order in which the banknotes are stored, whereby, after the dispensing transaction, the recognition unit reads the identification numbers of one or more banknotes fed out from the storage unit, and then the control unit matches the identification number read by the recognition unit with the identification number stored in the memory unit.

The control unit may confirm the inventory amount of the storage unit after the dispensing transaction by conducting a verification process for the storage unit. That is, if the storage unit feeds out and then restores all the banknotes stored therein, and, between this feeding and restring, the recognition unit counts the number of the banknotes, the control unit can confirm the inventory amount of the storage unit.

The above-described process of confirming the inventory amount of the storage unit using the stored identification numbers is included in the verification process in a broad sense. If the identification numbers are used, it is possible to confirm the inventory amount of the storage unit simply by dispensing part of the banknotes in the storage unit. The above-described process can be called a short verification process because the processing time is shorter.

A memory unit may store identification numbers of the banknotes stored in the storage unit; in the dispensing transaction, the recognition unit may read the identification numbers of the banknotes fed out from the storage unit and used for the dispensing transaction; and in a case where a rejected banknote occurs, a control unit may confirm an inventory amount of the storage unit based on the number of the banknotes after the dispensing transaction by matching the identification number of the banknote fed out last from the storage unit with the identification numbers stored in the memory unit, and may confirm the number of the rejected banknotes stored in the temporary storage unit in the dispensing transaction based on the number of banknotes transferred to the outlet in the dispensing transaction and the inventory amount of the storage unit confirmed after the dispensing transaction.

The banknote fed out last from the storage units in the dispensing transaction corresponds to the banknote not recognized as the rejected banknote and fed out to the outlet. Even if the storage unit does not feed out any additional banknotes after the dispensing transaction, it is possible to confirm the inventory amount of the storage unit after the dispensing transaction by matching the identification number of the banknote fed out last from the storage unit in the dispensing transaction with the identification numbers stored in the memory unit. If the inventory amount of the storage unit after the dispensing transaction can be confirmed, the number of the rejected banknotes stored in the temporary storage unit in the dispensing transaction can be confirmed as described above.

For each dispensing transaction, the memory unit may store the denomination and number of the rejected banknotes stored in the temporary storage unit.

Based on the contents in the memory unit, the temporary storage unit can feed out one or more rejected banknotes related to the dispensing transaction as banknotes used for the dispensing transaction.

In depositing transaction, a depositing unit may feed the banknotes into the banknote processing device; the recognition unit may recognize the banknotes fed from the depositing unit; the transport unit may transport the banknotes recognized by the recognition unit to the storage unit without the banknotes passing through the temporary storage unit; the storage unit may store the banknotes; and in the dispensing transaction, the transport unit may transport the banknotes recognized as the rejected banknotes by the recognition unit to the temporary storage unit.

The temporary storage unit may not be used in the depositing transaction. The temporary storage unit can be used to store the rejected banknotes that occur in the dispensing transaction.

The technology disclosed herein relates to a banknote processing device. The banknote processing device includes: a transport unit transporting banknotes along a transport path; a storage unit connected to the transport path and feeding out banknotes stored therein in dispensing transaction to the transport path; a recognition unit connected to the transport path and recognizing the banknotes fed out from the storage unit and used for the dispensing transaction; and a temporary storage unit connected to the transport path and storing and feeding out the banknotes, wherein in the dispensing transaction, the transport unit transports banknotes recognized as non-rejected banknotes by the recognition unit to an outlet, and transports banknotes recognized as rejected banknotes by the recognition unit to the temporary storage unit; the temporary storage unit stores the rejected banknotes; in a case where the temporary storage unit stores the rejected banknotes, in the dispensing transaction, the temporary storage unit feeds out the rejected banknotes to the transport path as banknotes used for the dispensing transaction; and the transport unit transports the banknotes fed out from the temporary storage unit to the outlet.

By the temporary storage unit feeding out the rejected banknotes as the banknotes used for the dispensing transaction, it is possible to reduce the number of banknotes stored in the temporary storage unit and also prevent the temporary storage unit from becoming full of banknotes. The person in charge collects the banknotes less frequently from the temporary storage unit, and thus it is possible to conduct smooth operation of the banknote processing device.

An embodiment of a banknote processing device and a method for controlling the banknote processing device will be described with reference to the drawings. The banknote processing device and the method for controlling the banknote processing device described herein are mere examples.

Figure 12:
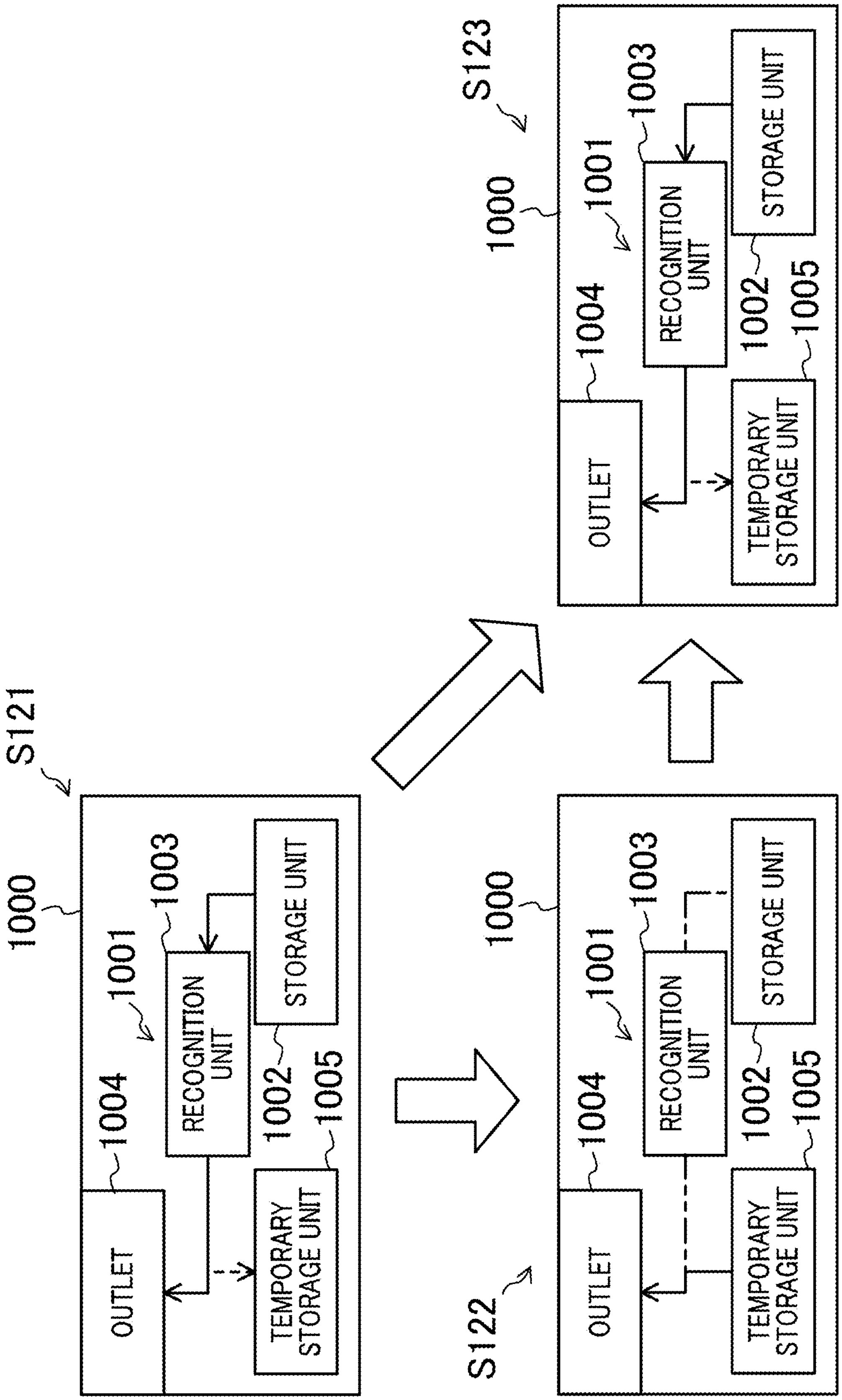
FIG. 12 shows a method for controlling the banknote processing device.

FIG. 12 describes the banknote processing device and the method for controlling the banknote processing device. The banknote processing device 1000 conducts at least dispensing transaction of banknotes. In the dispensing transaction, the banknote processing device 1000 dispenses the banknotes used for the dispensing transaction from the inside to the outside of the housing of the banknote processing device 1000.

The banknote processing device 1000 includes a transport unit 1001. The transport unit 1001 includes a transport path. In FIG. 12, the transport path is drawn by a solid line, a dashed line, or a two dot chain line. The transport path is located in the housing of the banknote processing device 1000. The transport unit 1001 transports the banknotes along the transport path. The banknotes are transported at intervals one by one. In the transport path, the banknote is transported with the edge of either the long side or the short side of the banknote being positioned in front.

The banknote processing device 1000 includes a storage unit 1002. The storage unit 1002 stores the banknotes used for dispensing transaction. The storage unit 1002 is located in the housing of the banknote processing device 1000. The storage unit 1002 is connected to the transport path. In the dispensing transaction, the storage unit 1002 feeds out the stored banknotes to the transport path as the banknotes used for the dispensing transaction.

The banknote processing device 1000 includes a recognition unit 1003. The recognition unit 1003 is connected to the transport path. The recognition unit 1003 recognizes the banknotes that are being transported. The banknotes pass through the recognition unit 1003.

The recognition unit 1003 includes one or more sensors to obtain the features of the banknotes.

In the dispensing transaction, the recognition unit 1003 identifies the denominations of the banknotes used for the dispensing transaction and also counts the number of banknotes. The recognition unit 1003 determines whether the banknote in question is a rejected banknote or a non-rejected banknote. The recognition unit 1003 recognizes the banknote in question as a rejected banknote if the banknote is transported in an overlapped manner or an off-angled manner, for example. The overlapped manner means that a plurality of banknotes are transported while being overlapped. The off-angled manner means that a banknote that is transported on the transport path is angled significantly off the transport direction. The banknotes being transported in the overlapped manner or the off-angled manner means the banknotes being transported in an unusual manner. If the banknotes are transported in an unusual manner, the recognition unit 1003 may fail to count the number of banknotes accurately.

The banknote processing device 1000 includes an outlet 1004. The outlet 1004 is connected to the transport path. The recognition unit 1003 is located in the middle of the transport path that connects the storage unit 1002 and the outlet 1004. In the transport direction of the banknotes, the storage unit 1002 is located on the first side of the recognition unit 1003, and the outlet 1004 is located on the second side of the recognition unit 1003. The transport unit 1001 transports the banknotes having passed through the recognition unit 1003 to the outlet 1004. The outlet 1004 holds the banknotes to be dispensed. The banknotes to be dispensed are transferred to the outside of the banknote processing device 1000 through the outlet 1004.

The banknote processing device 1000 includes a temporary storage unit 1005. The temporary storage unit 1005 is connected to the transport path. The temporary storage unit 1005 is connected to a transport path branching from the transport path that connects the recognition unit 1003 and the outlet 1004. In the transport direction of the banknotes, the temporary storage unit 1005 is located on the second side of the recognition unit 1003 similarly to the outlet 1004.

As described later, the banknotes having passed through the recognition unit 1003 are sorted into the outlet 1004 and the temporary storage unit 1005. The temporary storage unit 1005 stores the banknotes. The temporary storage unit 1005 can also feed out the stored banknotes.

The operation of the banknote processing device 1000 in the dispensing transaction will be described. Step S121 illustrates the transport route of banknotes in the dispensing transaction using the arrow direction. If a user instructs the banknote processing device 1000 to conduct the dispensing transaction, the storage unit 1002 feeds out the banknotes used for the dispensing transaction. The transport unit 1001 transports the banknotes fed out from the storage unit 1002 to the recognition unit 1003. The recognition unit 1003 recognizes the banknotes used for the dispensing transaction.

The transport unit 1001 transports the banknote recognized as a non-rejected banknote by the recognition unit 1003 to the outlet 1004. The outlet 1004 holds the banknotes to be dispensed. As indicated by the dashed arrow, the transport unit 1001 also transports the banknote recognized as a rejected banknote by the recognition unit 1003 to the temporary storage unit 1005. The temporary storage unit 1005 stores the rejected banknotes.

If the rejected banknotes occurs, the number of banknotes transported to the outlet 1004 is insufficient. Since the rejected banknotes occurs, the number (or amount) of banknotes transported to the outlet 1004 is insufficient for the amount of banknotes to be dispensed by an instruction. The storage unit 1002 continues to feed out the banknotes until all the banknotes to be dispensed are transported to the outlet 1004. If all the banknotes to be dispensed are transferred to the outlet 1004, the banknote processing device 1000 ends the dispensing transaction.

After the dispensing transaction ends, the temporary storage unit 1005 still stores the rejected banknotes. That is, after the dispensing transaction is ended, the banknote processing device 1000 does not restore the rejected banknotes in the temporary storage unit 1005 to the storage unit 1002. The rejected banknotes fed out from the temporary storage unit 1005 are still in an overlapped manner or an off-angled manner. When storing the rejected banknotes again, the storage unit 1002 might be jammed with the banknotes. Even if the rejected banknotes are restored to the storage unit 1002, those rejected banknotes are likely to be recognized as rejected banknotes again by the recognition unit 1003 when subsequently fed out from the storage unit 1002.

If another instruction to conduct the dispensing transaction is given after step S121, the banknote processing device 1000 determines whether the temporary storage unit 1005 stores the rejected banknotes. Step S122 illustrates the transport route of banknotes employed if the rejected banknotes are stored in the temporary storage unit 1005. The temporary storage unit 1005 feeds out the rejected banknotes as the banknotes used for the dispensing transaction. The transport unit 1001 transports the banknotes fed out from the temporary storage unit 1005 to the outlet 1004. At this time, the banknotes do not pass through the recognition unit 1003 as indicated by the solid arrow. Without being recognized by the recognition unit 1003, the banknotes are transferred to the outlet 1004.

If the banknotes transferred from the temporary storage unit 1005 to the outlet 1004 are insufficient for the banknotes to be dispensed, the banknote processing device 1000 transfers the banknotes that compensate for the insufficiency to the outlet 1004. Step S123 illustrates a transport route of banknotes. Step S123 is the same as step S121. That is, the storage unit 1002 feeds out the banknotes that compensate for the insufficiency, and after recognized by the recognition unit 1003, the banknotes used for the dispensing transaction are transferred to the outlet 1004. The transport unit 1001 transports the banknotes recognized as rejected banknotes by the recognition unit 1003 to the temporary storage unit 1005, and the temporary storage unit 1005 stores the rejected banknotes. The banknote processing device 1000 ends the dispensing transaction if a required number of banknotes to be dispensed is transferred to the outlet 1004.

Step S123 also illustrates the transport route of banknotes employed if another instruction to conduct the dispensing transaction is given after step S121 and the rejected banknotes are not stored in the temporary storage unit 1005. In this case, the storage unit 1002 feeds out all the banknotes to be dispensed.

As described above, the rejected banknotes stored in the temporary storage unit 1005 are not restored to the storage unit 1002. Every time the rejected banknote occurs in the dispensing transaction, the number of rejected banknotes stored in the temporary storage unit 1005 increases. If the temporary storage unit 1005 becomes full of banknotes, the banknote processing device 1000 will shut down. This is because the temporary storage unit 1005 that is full of banknotes cannot store any more rejected banknotes. When or before the temporary storage unit 1005 becomes full of banknotes, the person in charge should collect the banknotes from the temporary storage unit 1005.

The temporary storage unit 1005 feeds out the rejected banknotes as the banknotes used for the dispensing transaction, whereby the number of banknotes stored in the temporary storage unit 1005 is reduced. The temporary storage unit 1005 is less likely to become full of banknotes. The person in charge collects the banknotes less frequently from the temporary storage unit 1005, and thus it is possible to conduct smooth operation of the banknote processing device 1000.

FIG. 1 shows a banknote processing device 1. The banknote processing device 1 is a variation of the banknote processing device 1000 of FIG. 12. Each configuration of the variation of the banknote processing device can be applied to the banknote processing device 1000 of FIG. 12 individually or in combination with other configurations within a reasonable scope. The method for controlling the banknote processing device described below can be applied to the banknote processing device 1000 of FIG. 12, the method for controlling the banknote processing device 1000, and the variations thereof within a reasonable range.

The banknote processing device 1 is installed in a financial institution, for example. A user of the banknote processing device 1 is a customer of the financial institution, for example. The user can conduct a depositing transaction or a dispensing transaction using the banknote processing device 1. The installation location of the banknote processing device 1 is not limited to a particular place.

The banknote processing device 1 handles loose notes. That is, the banknote processing device 1 operates so that banknotes are taken one by one from a depositing unit 21 into a transport unit 4, both of which will be described later. The banknote processing device 1 operates so that banknotes are dispensed one by one from the transport unit 4 to a dispensing unit 22, which will be described later. The banknote processing device 1 deposits banknotes from a user and dispenses banknotes to the user. The banknote processing device 1 may be installed alone, or may be combined with another apparatus, for example, a coin processing device that handles coins and/or a check processing device that handles checks.

The banknote processing device 1 includes a processing unit 11 and a safe unit 13. The processing unit 11 is located in an upper part of the banknote processing device 1. The processing unit 11 includes an upper housing 111. The safe unit 13 is located below the processing unit 11. The safe unit 13 includes a safe housing 131. The safe housing 131 protects contents at or above a predetermined security level. The security level of the safe housing 131 is higher than that of the upper housing 111. Specifically, the safe housing 131 is made of a metal board with a thickness larger than or equal to a predetermined thickness.

The processing unit 11 includes the depositing unit 21. The depositing unit 21 is a part to which the user inserts banknotes in the depositing transaction, for example. The depositing unit 21 includes an inlet 211. The inlet 211 of the depositing unit 21 is open to the outside of the upper housing 111. The user manually inserts the banknotes to the depositing unit 21 through the inlet 211. The depositing unit 21 is box-shaped and can hold a plurality of banknotes. The depositing unit 21 includes a mechanism that feeds the banknotes one by one into the upper housing 111.

The processing unit 11 includes the dispensing unit 22. The dispensing unit 22 is a part from which the banknotes are dispensed in the dispensing transaction, for example. The dispensing unit 22 is box-shaped and can hold a plurality of banknotes. The dispensing unit 22 includes an outlet 221. The outlet 221 of the dispensing unit 22 is open to the outside of the upper housing 111. The user can manually pick up the banknotes held in the dispensing unit 22 through the outlet 221.

The processing unit 11 includes a temporary storage unit 24. As described later, the temporary storage unit 24 stores the rejected banknotes that occurred in the dispensing transaction. The temporary storage unit 24 is not used in the depositing transaction. The temporary storage unit 24 can feed out the stored banknotes. The structure of the temporary storage unit 24 will be described in detail later.

The processing unit 11 includes an upper transport path 41. The banknotes are transported one by one at intervals along the upper transport path 41. The upper transport path 41 includes a looped transport path. The banknotes are transported along the looped transport path in the clockwise direction or counterclockwise direction in FIG. 1. The depositing unit 21, the dispensing unit 22, and the temporary storage unit 24 are each connected to a transport path that branches from the looped transport path. The banknotes inserted into the depositing unit 21 are transported from the depositing unit 21 to the looped transport path. The banknotes transported along the looped transport path are selectively transported to the dispensing unit 22 or the temporary storage unit 24. The banknotes fed out from the temporary storage unit 24 are transported from the temporary storage unit 24 to the looped transport path.

The processing unit 11 includes a recognition unit 25. The recognition unit 25 is located in the looped transport path. The banknotes pass through the recognition unit 25. The recognition unit 25 recognizes each banknote one by one that passes through the recognition unit 25. The recognition unit 25 includes a sensor that obtains the features of the banknotes. The recognition unit 25 includes an image sensor, an infrared sensor, a UV sensor, and a magnetic sensor, for example. The recognition unit 25 identifies the denomination, authenticity, and fitness of the banknote based on the features of the banknote. The recognition unit 62 also obtains the identification number printed on the banknote. The identification number is a serial code that consists of a plurality of symbols, for example. The identification number includes at least two types of symbol among numbers, letters, and marks.

The safe unit 13 includes a storage unit. The safe unit 13 includes a first storage unit 31, a second storage unit 32, a third storage unit 33, a fourth storage unit 34, and a fifth storage unit 35.

Each of the first storage unit 31, the second storage unit 32, the third storage unit 33, the fourth storage unit 34, and the fifth storage unit 35 is a stack-type storage unit. The stack-type storage unit stores in a stack state the banknotes inserted from the opening of the storage unit. The stack-type storage unit shown in FIG. 1 feeds out the stored banknotes from the same opening as used when the banknotes are stored. The storage unit is a so-called last-in-first-out type storage unit. The stack-type storage unit can employ various known structures.

Each of the first storage unit 31, the second storage unit 32, the third storage unit 33, and the fifth storage unit 35 includes one storage region. The fourth storage unit 34 includes two storage regions: an upper region 51 and a lower region 52. The upper region 51 and the lower region 52 are independent of each other. The fourth storage unit 34 includes an opening of the upper region 51 and an opening of the lower region 52.

For example, the first storage unit 31, the second storage unit 32, the third storage unit 33, or the upper region 51 or the lower region 52 of the fourth storage unit 34 may store one denomination of banknote. The first storage unit 31, the second storage unit 32, the third storage unit 33, and the upper region 51 and lower region 52 of the fourth storage unit 34 may store different denominations of banknote. The fifth storage unit 35 may store the banknotes that are not stored in the first storage unit 31, the second storage unit 32, the third storage unit 33, and the fourth storage unit 34. The fifth storage unit 35 may store different denominations of banknote in a mixed manner. The fifth storage unit 35 may be a storage unit used in a verification process. In this case, the fifth storage unit 35 is normally empty.

The safe unit 13 includes a lower transport path 42. The banknotes are transported one by one at intervals along the lower transport path 42. The lower transport path 42 includes a plurality of branch paths that branch from the looped transport path 41 of the upper transport path. Each of the first storage unit 31, the second storage unit 32, the third storage unit 33, the upper region 51 and the lower region 52 of the fourth storage unit 34, and the fifth storage unit is connected to the plurality of branch paths of the lower transport path 42. The banknotes transported along the looped transport path are selectively transported to the first storage unit 31, the second storage unit 32, the third storage unit 33, the upper region 51 or the lower region 52 of the fourth storage unit 34, or the fifth storage unit 35 via the lower transport path 42. The banknotes fed out to the lower transport path 42 from the first storage unit 31, the second storage unit 32, the third storage unit 33, the upper region 51 or the lower region 52 of the fourth storage unit 34, or the fifth storage unit 35 are transported to the looped transport path.

The safe housing 131 includes a door with a key. When the door is opened, the inside of the safe housing 131 is opened. The first to fifth storage units 31 to 35 in the safe housing 131 are pulled out from the safe housing 131. In the operation of the financial institution, a person who opens the door of the safe housing 131 is required to have a special authorization.

The configuration of the safe unit in FIG. 1 is an example. The number and arrangement of the storage units and the configuration of each storage unit in the safe housing 131 are not limited to those shown in FIG. 1.

The transport unit 4 transports banknotes along the upper transport path 41 or the lower transport path 42. These transport paths are combination of a large number of rollers, a plurality of belts, a motor for driving the rollers, and a plurality of guides. Each banknote is transported along the upper transport path 41 and the lower transport path 42 with the edge of the long side of the banknote being positioned in front. Each banknote may be transported with the edge of the short side of the banknote being positioned in front.

A diverter is provided at each branching position in the upper transport path 41 and the lower transport path 42. The diverter switches the transport direction of the banknotes. The structure of the diverter is known. A tracking sensor is provided at each location in the upper transport path 41 and the lower transport path 42. The tracking sensor is an optical, ultrasonic, or mechanical sensor that detects that the banknote passes. The tracking sensor outputs a detection signal to a controller 15 described later. The transport unit 4 controls each diverter based on the control signal from the controller 15 and the detection signal from the tracking sensor. The banknotes are transported to a predetermined destination.

The configuration of the transport unit 4 in FIG. 1 is an example. The configuration of the upper transport path 41 and the lower transport path 42 can be modified as necessary according to the arrangement of the depositing unit 21, the dispensing unit 22, the temporary storage unit 24, the recognition unit 25, and the storage unit.

Figure 2:
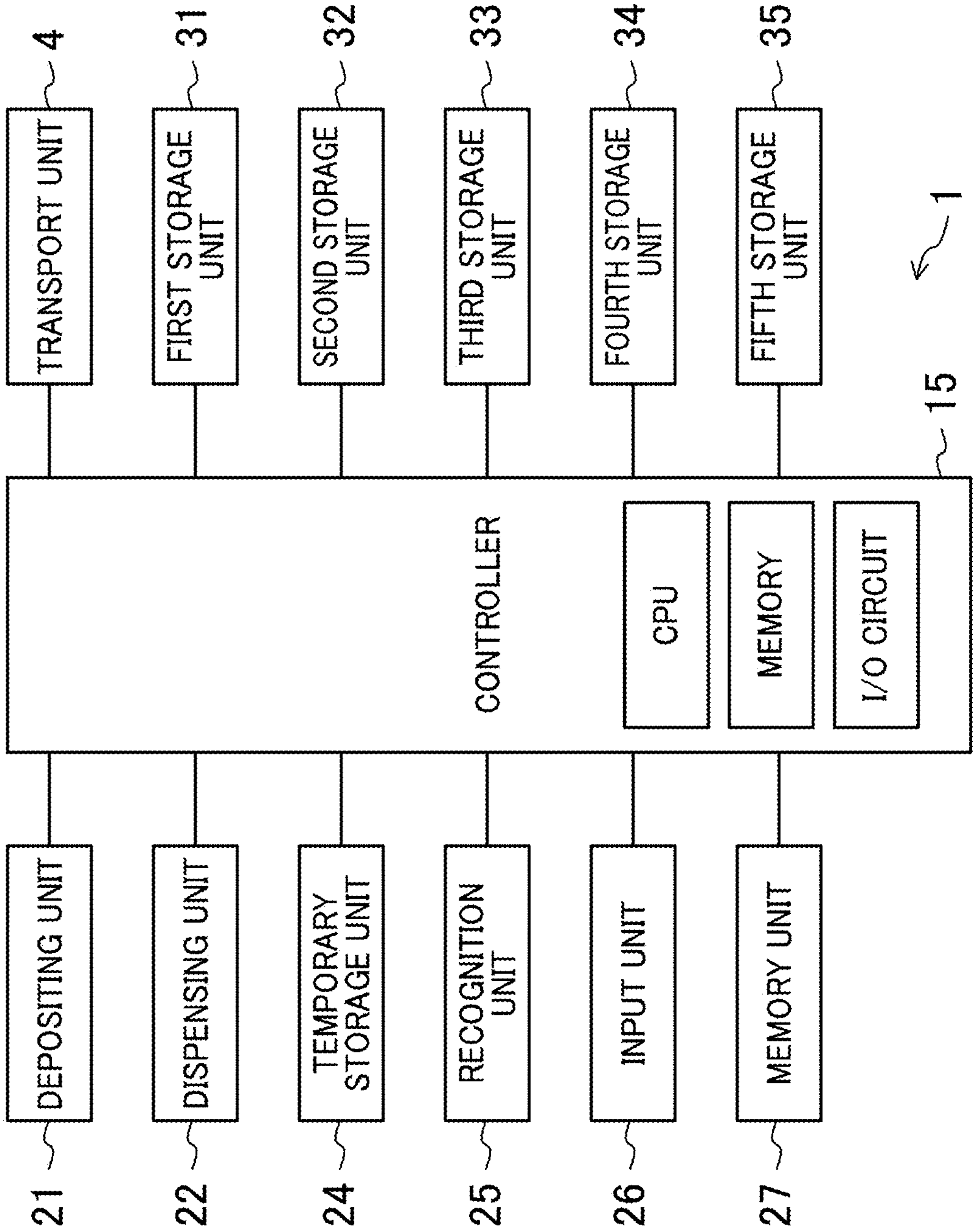
FIG. 2 is a block diagram of the banknote processing device.

As shown in FIG. 2, the banknote processing device 1 includes a controller 15. The controller 15 is an example of the control unit. The controller 15 may include a central processing unit (CPU), a memory, and an I/O circuit. The CPU executes a program. The memory stores programs and data to operate the banknote processing device 1. The memory is, for example, a random access memory (RAM) and/or a read only memory (ROM). The I/O circuit inputs and outputs electric signals between the controller 15 and each device connected to the controller 15. The controller 15 is connected to and is capable of exchanging signals with the depositing unit 21, the dispensing unit 22, the temporary storage unit 24, the recognition unit 25, the transport unit 4, the first storage unit 31, the second storage unit 32, the third storage unit 33, the fourth storage unit 34, and the fifth storage unit 35.

The banknote processing device 1 includes an input unit 26. The input unit 26 is connected to and is capable of exchanging signals with the controller 15. The input unit 26 is a part which the user uses to conduct operation. The input unit 26 may be a touch panel display, and/or an encrypting pin pad (EPP), for example. Through the input unit 26, the user can instruct the banknote processing device 1 to execute the depositing transaction or the dispensing transaction. The input unit 26 may also be a receiver that receives signals from an external device. By the user operating the external device, the external device transmits a signal to the input unit 26. The input unit 26 outputs a signal of the user's operation to the controller 15.

The banknote processing device 1 includes a memory unit 27. The memory unit 27 stores various types of information. For example, the memory unit 27 stores the information on the banknotes stored in the first storage unit 31, the second storage unit 32, the third storage unit 33, the fourth storage unit 34, and the fifth storage unit 35. Specifically, the memory unit 27 stores the number of banknotes and the denomination of the banknotes stored in each of the storage units 31 to 35. The memory unit 27 also stores the inventory amount of each of the storage units 31 to 35. The inventory amount is a total amount based on the number of banknotes and the denomination of the banknotes.

Figure 5:
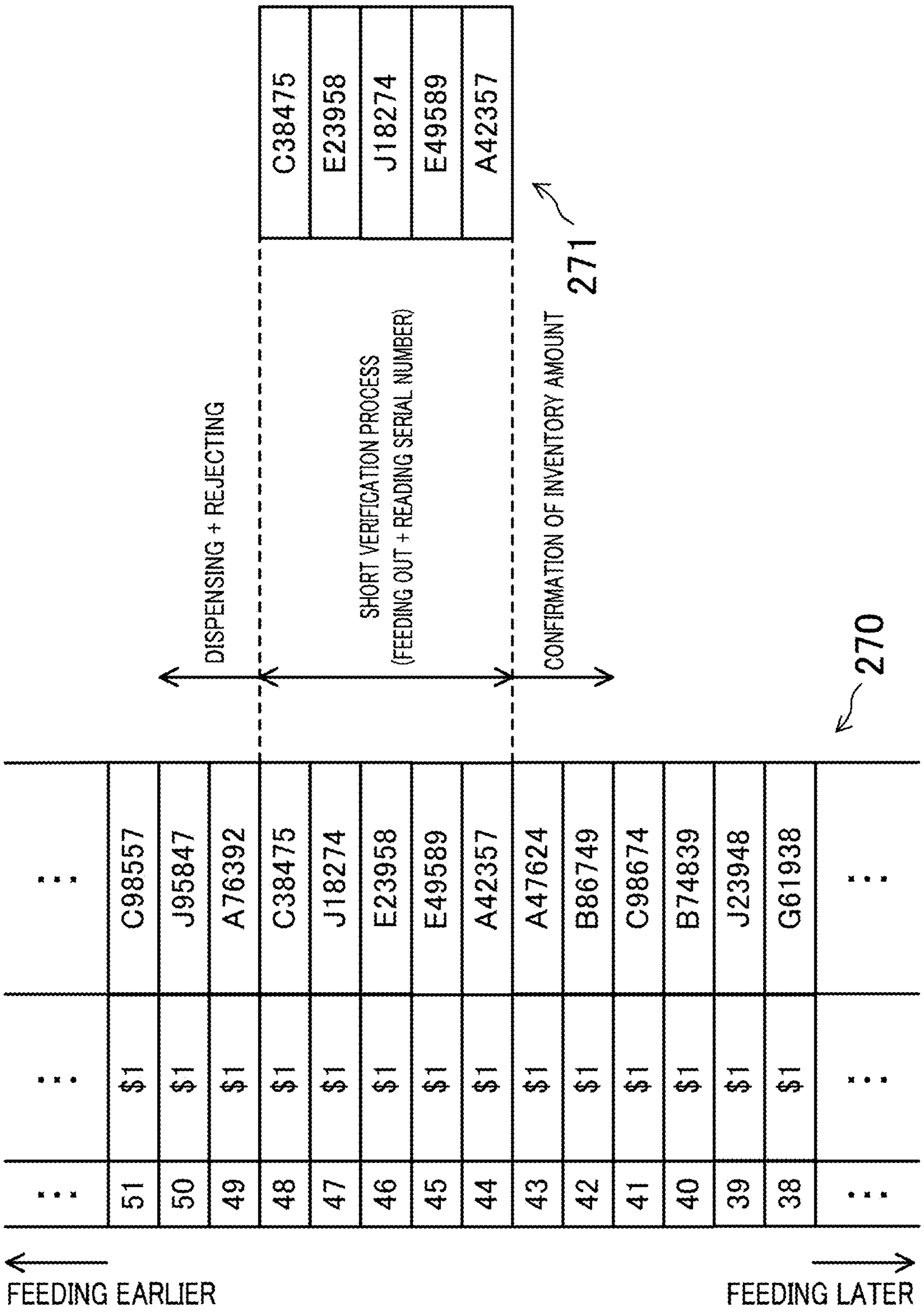
FIG. 5 shows the information that a memory unit stores about banknotes in a storage unit, and the principle according to which the inventory amount of the storage unit can be determined through a short verification process.

The memory unit 27 stores the identification number of every single banknote stored in each of the storage units 31 to 35. As shown in FIG. 5, the memory unit 27 stores the identification numbers in the order in which banknotes are stored in each of the storage units 31 to 35. The information on the banknotes of which the storage orders and the identification numbers are linked with each other may hereinafter be referred to as the identification number list 270.

Figure 7:
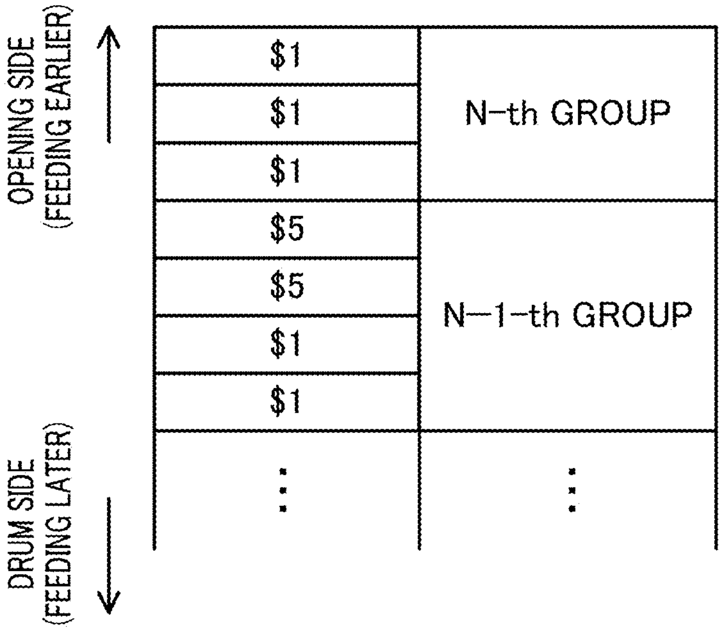
FIG. 7 shows the information that the memory unit stores about the rejected banknotes in the temporary storage unit.

The memory unit 27 also stores the information on the banknotes stored in the temporary storage unit 24 (see FIG. 7). This will be described in detail later.

The controller 15 outputs control signals to the depositing unit 21, the dispensing unit 22, the temporary storage unit 24, the recognition unit 25, the transport unit 4, the first storage unit 31, the second storage unit 32, the third storage unit 33, the fourth storage unit 34, and the fifth storage unit 35, so that the banknote processing device 1 conducts a predetermined operation when receiving a signal from the input unit 26 about the user's instruction. It will be described below how the banknote processing device 1 performs conducts various processes.

(Depositing Transaction)

Figure 3:
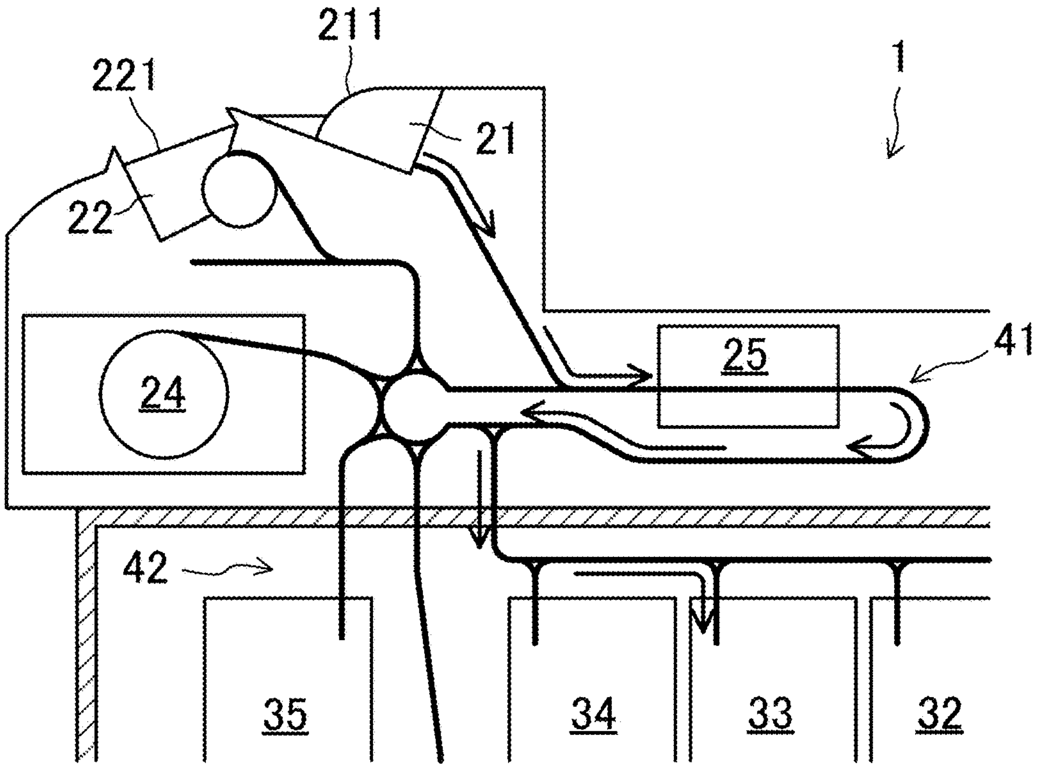
FIG. 3 shows a transport route of banknotes in the depositing transaction.

FIG. 3 shows the transport route of banknotes in the banknote processing device 1 in the depositing transaction, using the arrows. The user inserts the banknotes to be deposited into the depositing unit 21. The depositing unit 21 feeds outs the banknotes one by one into the upper housing 111. The transport unit 4 transports the banknotes to the recognition unit 25. The recognition unit 25 recognizes the banknotes. The recognition unit 25 also reads the identification numbers from the banknotes.

According to the recognition results of the recognition unit 25, the transport unit 4 transports the banknotes to the first storage unit 31, the second storage unit 32, the third storage unit 33, the fourth storage unit 34, or the fifth storage unit 35. FIG. 3 illustrates an exemplary case in which the transport destination of the banknote is the third storage unit 33. The storage units 31 to 35 store banknotes. The transport unit 4 transports the banknotes recognized as the rejected banknote by the recognition unit 25 to the dispensing unit 22 in order to return them to the user. If all the banknotes inserted into the depositing unit 21 are taken into the banknote processing device 1, the depositing transaction ends. The temporary storage unit 24 is not used in the depositing transaction. In the depositing transaction, the banknotes may be temporarily stored in the temporary storage unit 24, which is a so-called temporarily suspended deposit. For the temporarily suspended deposit, a part in which no banknote is present is provided between a group of rejected banknotes already stored in the temporary storage unit 24 (which will be described in detail later) and the banknotes subject to the temporarily suspended deposit in order for those two not to overlap each other. The part in which no banknote is present may be sufficiently longer than the interval between the banknotes stored in the temporary storage unit 24 in one dispensing transaction.

The memory unit 27 stores the information on the banknotes stored in the storage units 31 to 35. The memory unit 27 stores the identification number list 270 as shown in FIG. 5. That is, for each storage unit, in the order in which the banknotes are stored, the memory unit 27 stores the identification numbers that the recognition unit 25 read from the banknotes. In the identification number list 270 in FIG. 5, the serial numbers of the banknotes stored in the storage unit ("38" to "51" in the example of FIG. 5), the denomination of the banknotes ($1 in the example of FIG. 5), and the identification numbers (G61938 etc. in the example of FIG. 5) are linked with each other. The highest serial number corresponds to the number of banknotes stored in the storage unit (in other words, the inventory amount in the storage unit that stores the same denomination of banknote). The memory unit 27 updates the identification number list 270 for each of the storage units 31 to 35 every time the depositing transaction is conducted. The identification number list 270 stored in the memory unit 27 reflects the latest storage state of each of the storage units 31 to 35.

(Basic Operation of Dispensing Transaction)

Figure 4:
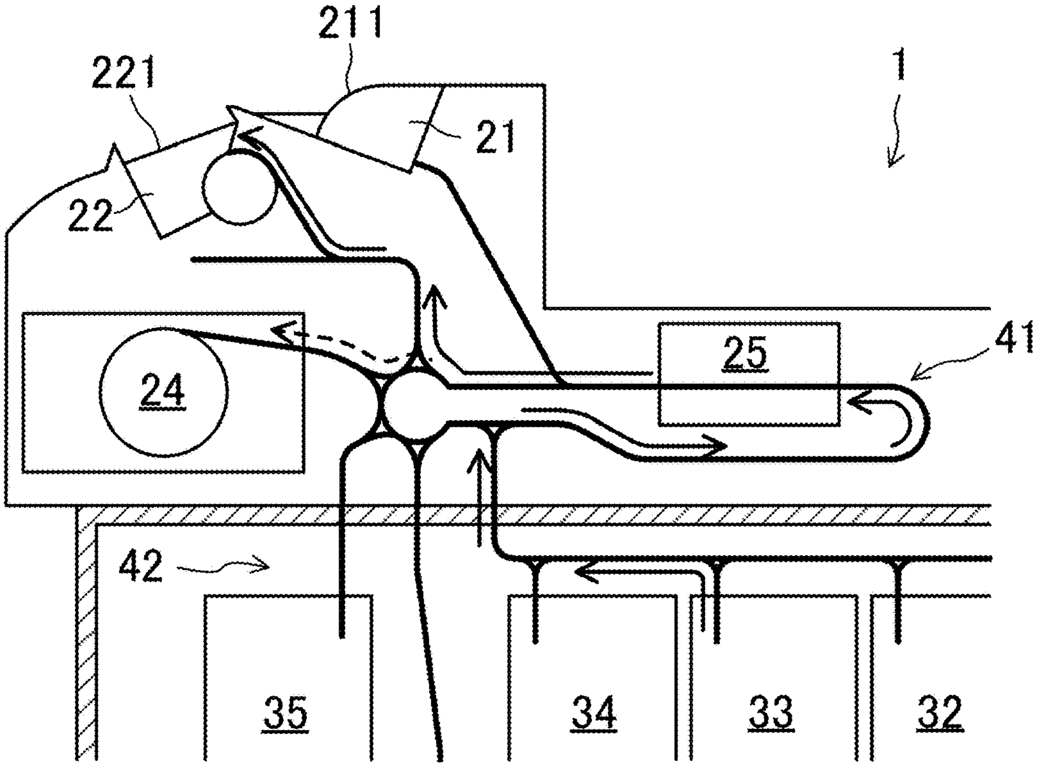
FIG. 4 shows a transport route of banknotes in the dispensing transaction.

FIG. 4 shows the transport route of banknotes in the banknote processing device 1 in the dispensing transaction, using the arrows. Through the input unit 26, the user specifies the denomination and the number of the banknotes to be dispensed. The user may specify the amount of the banknotes to be dispensed.

The storage units 31 to 35 feed out the banknotes to be dispensed. Specifically, the storage unit that stores the banknotes of which the denomination is subject to dispensing feeds out the banknotes. FIG. 4 illustrates an example in which the third storage unit 33 feeds out the banknotes. The transport unit 4 transports the banknotes to the recognition unit 25. The recognition unit 25 recognizes the banknotes. The transport unit 4 transports the banknotes recognized as non-rejected banknotes, or normal banknotes, by the recognition unit 25 to the dispensing unit 22. The dispensing unit 22 holds the banknotes.

The recognition unit 25 recognizes the banknote transported in an overlapped manner or an off-angled manner as a rejected banknote. As indicated by the dashed arrow in FIG. 4, the transport unit 4 transports the banknote recognized as a rejected banknote by the recognition unit 25 to the temporary storage unit 2. The temporary storage unit 24 stores the rejected banknotes. The temporary storage unit 24 is used in the dispensing transaction.

If all the banknotes to be dispensed are dispensed to the dispensing unit 22, the dispensing transaction ends. If the rejected banknote occurs in the dispensing transaction, the storage units 31 to 35 feed out more banknotes than the number of banknotes to be dispensed.

After the dispensing transaction, the memory unit 27 deletes the data on the banknotes fed out by the storage units 31 to 35. From the identification number list 270, the memory unit 27 deletes the identification numbers that the recognition unit 25 read from the banknotes in the dispensing transaction. The memory unit 27 updates the identification number list 270 for each of the storage units 31 to 35 every time the dispensing transaction is conducted. The identification number list 270 stored in the memory unit 27 reflects the latest storage state of each of the storage units 31 to 35.

Here, the banknote processing device 1 can store the rejected banknotes that occurred in the dispensing transaction in any of the storage units 31 to 35 instead of storing the rejected banknotes in the temporary storage unit 24. However, since the rejected banknotes are the banknotes transported in an unusual manner, the stack-type storage units 31 to 35 cannot feed out one by one the plurality of overlapped banknotes or the off-angled banknotes stored therein. The storage units 31 to 35 that store the rejected banknotes cannot be used as the storage units that feed out the banknotes. If the rejected banknotes are stored in the storage unit 31 to 35 in the safe housing 131, the person in charge with a special authorization needs to open the door of the safe housing 131 and take out the rejected banknotes stored in the storage units 31 to 35. For this reason, the banknote processing device 1 stores the rejected banknotes that occurred in the dispensing transaction in the temporary storage unit 24.

However, the temporary storage unit 24 has a smaller capacity than the storage units 31 to 35, and thus is likely to become full of banknotes if the rejected banknotes are repeatedly stored in the dispensing transaction. Measures against this problem will be described later.

(Verification Process after Dispensing Transaction)

If the rejected banknote occurs in the dispensing transaction, the controller 15 cannot confirm the number of banknotes dispensed from the storage units 31 to 35. This is because the rejected banknotes might include a plurality of overlapped banknotes. If the rejected banknote occurs in the dispensing transaction, the controller 15 executes a process to confirm the inventory amount of the storage units 31 to 35 after the dispensing transaction ends. The storage unit subject to this process is the storage unit that has dispensed the rejected banknotes in the dispensing transaction.

The controller 15 executes a short verification process using the identification number lists 270 of the storage units 31 to 35. The short verification process is described in detail in Japanese Patent No. 5759289 held by the applicant of the present application.

Specifically, the storage unit subject to the short verification process feeds out one or more banknotes. The number of banknotes to be fed out may be set to any number and may be set to two or more and five maximum. This is because if the number of banknotes to be fed out is higher, the process needs longer time. Further, in the stack-type storage unit, the order of banknotes may be switched when the banknotes are stored, and the actual order of the banknotes stored in the storage unit might not match the order of the banknotes in the identification number list 270 that is based on the recognition order of the recognition unit 25. As described later, it is preferable that the number of banknotes to be dispensed is two or more in order to match a plurality of identification numbers.

The transport unit 4 transports the banknotes fed out from the storage unit to the recognition unit 25. The recognition unit 25 recognizes the banknotes and reads the identification numbers. As shown in FIG. 5, a target group 271 of the identification numbers read by recognition unit 25 is formed. The recognized banknote is temporarily stored in a storage unit different from the storage unit that has fed out the banknote (for example, the fifth storage unit 35).

The controller 15 matches the identification number list 270 with the target group 271, thereby determining a group in the identification number list 270 that corresponds to the target group 271. In FIG. 5, the group in the identification number list 270 that contains No. 44 to 48 corresponds to the target group 271. It is allowable that the order of the identification numbers in the target group 271 does match the order of the identification numbers in the identification number list 270. As described above, this is because the actual order of the banknotes stored in the storage unit might not match the order of the banknotes in the identification number list 270.

If a group in the identification number list 270 that corresponds to the target group 271 can be determined, the banknotes stored in the storage unit can be confirmed. In the example of FIG. 5, the banknotes of No. 43 and earlier are stored in the storage unit. The controller 15 can confirm the inventory amount of the storage unit.

The banknotes fed out in the short verification process are restored to the original storage unit after the short verification process ends. The controller 15 confirms the inventory amount of the storage unit including the restored banknotes.

If the inventory amount of the storage unit can be confirmed after the dispensing transaction, the number of banknotes stored in the temporary storage unit 24, which are the rejected banknotes that occurred in the dispensing transaction, can also be confirmed. The controller 15 confirms the number of banknotes stored in the temporary storage unit 24 based on the following calculation formula.

[Number of banknotes stored in temporary storage unit 24]=[Number of banknotes in storage unit before dispensing transaction]−[Number of banknotes in storage unit after dispensing transaction]−[Number of banknotes dispensed]

As described later, the memory unit 27 separately stores the denomination and number of banknotes stored in the temporary storage unit 24.

The controller 15 may execute a verification process instead of the short verification process. That is, if the storage unit subject to the verification process feeds out and then restores all the banknotes stored therein, and, between this feeding and restring, the recognition unit 25 recognizes the denominations of the banknotes and counts the number of them, the controller can confirm the inventory amount of the storage unit.

(Storage of Rejected Banknotes in Temporary Storage Unit)

After the dispensing transaction ends, the temporary storage unit 24 still stores the rejected banknotes. The rejected banknotes are not restored to the storage units 31 to 35. If a rejected banknote occurs when the banknote processing device 1 conducts the subsequent dispensing transaction, the temporary storage unit 24 additionally stores the new rejected banknote.

Figure 6:
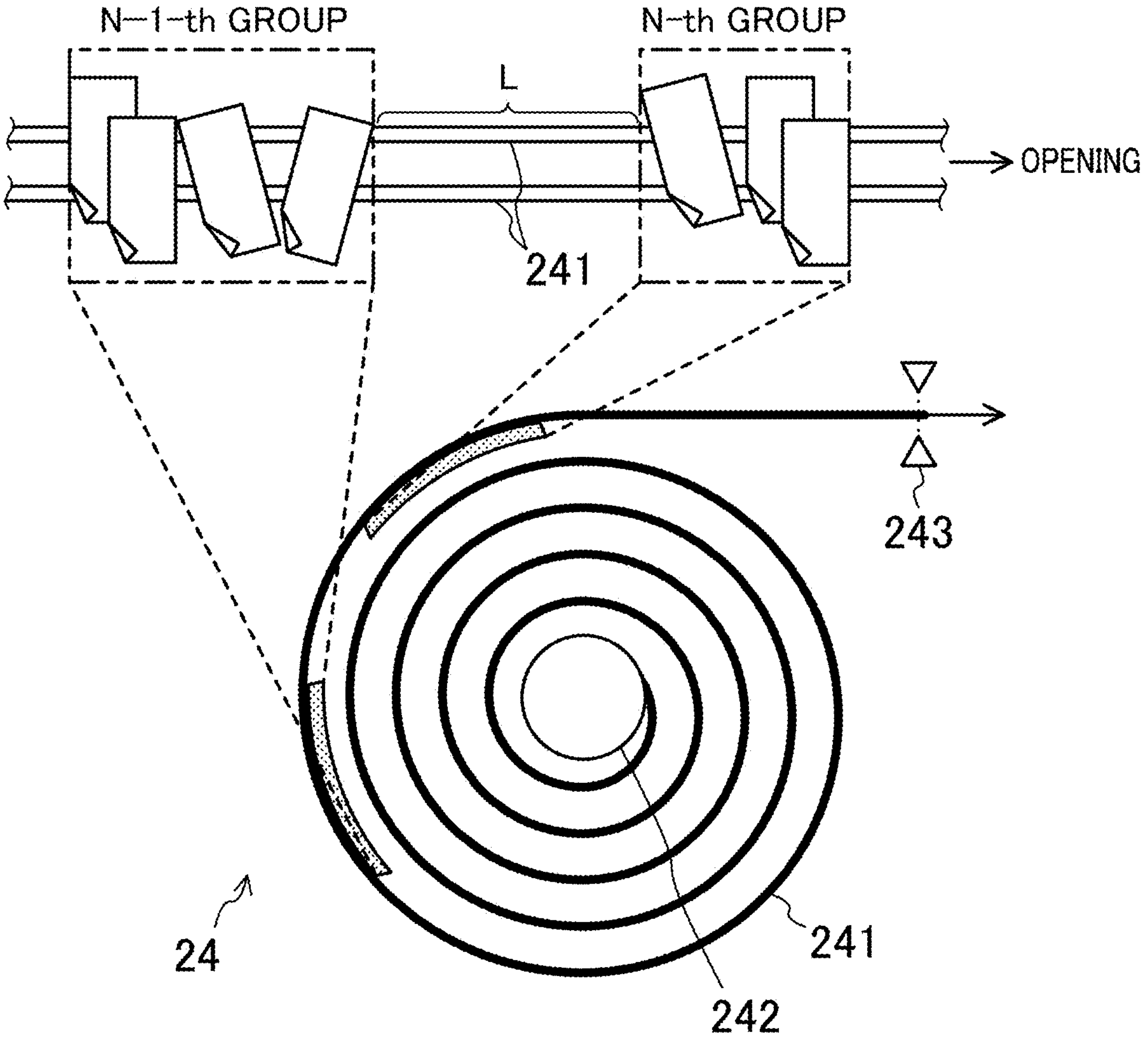
FIG. 6 shows a storage state of the rejected banknotes in a temporary storage unit.

FIG. 6 schematically illustrates a storage state of banknotes in the temporary storage unit 24. The temporary storage unit 24 includes a tape 241 and a drum 242. The temporary storage unit 24 is a drum-winding type storage unit. The lower part of FIG. 6 shows the tape 241 and the banknotes wound around the drum 242. FIG. 6 illustrates that the tape 241 is wound around the drum 242 with a gap in the radial direction, but in practice, no such gap is provided. The upper part of FIG. 6 shows a developed view of the tape 241 and the banknotes wound around the drum 242.

The drum 242 reels the banknotes with the tape 241 that have been put in through the opening of the temporary storage unit 24. The tape 241 wound around the drum 242 is pulled out, whereby the banknotes are fed out through the opening of the temporary storage unit 24. The temporary storage unit 24 can employ various known structures. The drum-winding type storage unit has an advantage of storing various banknotes, such as a plurality of overlapped banknotes and off-angled banknotes. The drum-winding type temporary storage unit 24 also has an advantage of not switching the order of banknotes when feeding out the banknotes. The drum-winding type temporary storage unit 24 is a last-in-first-out type storage unit. The drum-winding type temporary storage unit 24 stores banknotes, where the banknotes stored earlier are positioned closer to the center of the drum 242 in the direction in which the tape is wound than the banknotes stored later. Accordingly, the drum-winding type temporary storage unit 24 feeds out the banknotes stored later and then the banknotes stored earlier in sequence.

In the dispensing transaction, the drum 242 rotates in synchronization with the banknotes being stored into the temporary storage unit 24. The banknotes stored earlier in the temporary storage unit 24 are positioned relatively closer to the drum 242, and the banknotes stored later are positioned relatively close to the opening of the temporary storage unit 24. The interval between the banknotes stored in the temporary storage unit 24 in one dispensing transaction is relatively narrow.

The rejected banknotes that occurred in one dispensing transaction are wound around the drum 242 so as to form one group in the temporary storage unit 24. That is, after one dispensing transaction ends and before the rejected banknotes are stored in the temporary storage unit 24 in the subsequent dispensing transaction, the drum 242 reels only a predetermined amount of the tape 241. A part L in which no banknote is present is provided between the group of rejected banknotes that occurred in one dispensing transaction (that is, the N−1th group) and the group of rejected banknotes that occurred in the subsequent dispensing transaction (that is, the N-th group). The part L is sufficiently longer than the interval between the banknotes stored in the temporary storage unit 24 in one dispensing transaction. The part L is a boundary between group and group.

The temporary storage unit 24 includes the tracking sensor 243 located near the opening. The tracking sensor 243 is an optical sensor, for example. The tracking sensor 243 detects that the banknote passes when the banknote is stored into the temporary storage unit 24 and when the banknote is fed out from the temporary storage unit 24. The tracking sensor 243 outputs a detection signal to the controller 15.

The temporary storage unit 24 and the controller 15 can feed out the banknotes group by group based on the detection signal from the tracking sensor 243 as described later. That is, if, while the tape 241 is pulled out from the drum 242, the tracking sensor 243 does not detect for a period that a banknote passes, the controller 15 can determine that there is a boundary between one group and another. The temporary storage unit 24 can feed out the banknotes of one group and also can feed out the banknotes of a plurality of groups in sequence.

The drum-winding type temporary storage unit 24 winds the banknotes around the drum 242 by using the tape 241, and thus can feed out a plurality of overlapped banknotes just as they are, or off-angled banknotes just as they are. That is, although it is difficult for the drum-winding type temporary storage unit 24 to feed out part of the banknotes in the group, it is possible to feed out all the banknotes in the group.

FIG. 7 illustrates the storage information of the rejected banknotes that is stored in the memory unit 27. The memory unit 27 stores the denominations of the rejected banknotes in the order in which the rejected banknotes are stored in the temporary storage unit 24. The memory unit 27 also stores the information on the rejected banknotes for each dispensing transaction, in other words, for each group. The memory unit 27 stores the information on the denomination and number of banknotes of each group. In the example of FIG. 7, the N−1th group of which the banknotes are stored earlier and fed out later includes two 1-dollar banknotes and two 5-dollar banknotes, and the N-th group of which the banknotes are stored later and fed out earlier includes three 1-dollar banknotes.

(Dispensing Transaction Using Rejected Banknotes)

As described above, the temporary storage unit 24 can store a smaller amount of banknotes, or has a smaller capacity of banknotes than the storage units 31 to 35. If the dispensing transaction is repeated, the temporary storage unit 24 might become full of banknotes because the number of rejected banknotes stored in the temporary storage unit 24 increases. If the temporary storage unit 24 becomes full of banknotes, the temporary storage unit 24 cannot store the rejected banknotes that occurred in the dispensing transaction, and thus the banknote processing device 1 cannot conduct the dispensing transaction. If the temporary storage unit 24 becomes full of banknotes, the banknote processing device 1 will shut down. By the person in charge collecting the rejected banknotes stored in the temporary storage unit 24, the banknote processing device 1 resumes operation. If the capacity of the temporary storage unit 24 is small, the person in charge might need to work more.

If the rejected banknotes are stored in the temporary storage unit 24, in the dispensing transaction, the banknote processing device 1 uses the rejected banknotes of the temporary storage unit 24 as the banknotes for the dispensing transaction. The number of banknotes stored in the temporary storage unit 24 decreases by the temporary storage unit 24 feeding out the banknotes. The temporary storage unit 24 is less likely to become full of banknotes.

Figure 8:
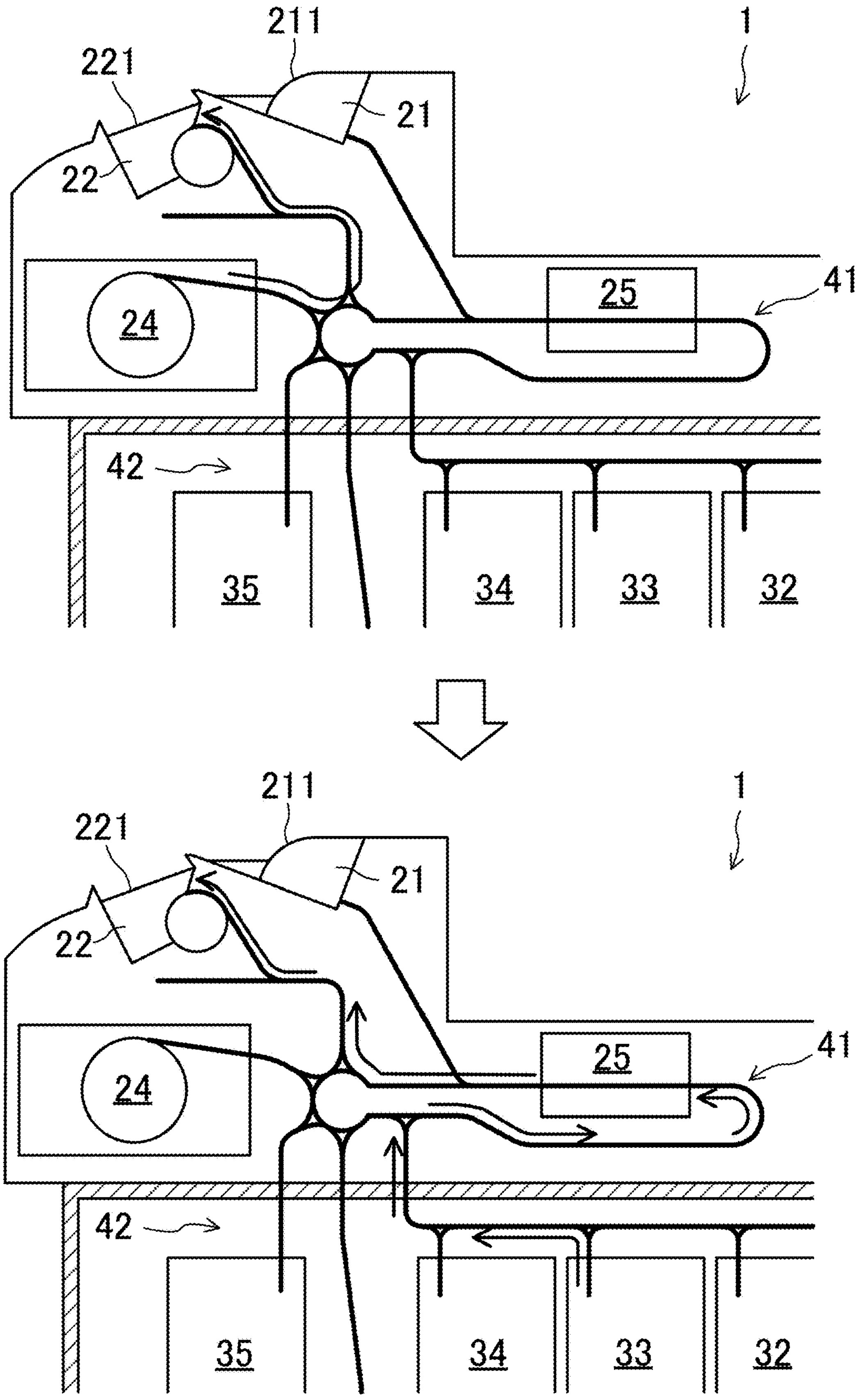
FIG. 8 shows a transport route of banknotes in the dispensing transaction, where the rejected banknotes in the temporary storage unit are fed out as banknotes used for the dispensing transaction.

FIG. 8 shows a transport route of banknotes in the dispensing transaction, where the temporary storage unit 24 stores the rejected banknotes.

As shown in the upper part of FIG. 8, the temporary storage unit 24 feeds out the rejected banknotes as the banknotes used for the dispensing transaction. The transport unit 4 transports the banknotes fed out from the temporary storage unit 24 to the dispensing unit 22. In this time, the transport unit 4 bypasses the recognition unit 25 and transports the banknotes from the temporary storage unit 24 to the dispensing unit 22. Since the recognition unit 25 is located in the looped transport path, the transport unit 4 can transport the banknotes from the temporary storage unit 24 to the dispensing unit 22 without the banknotes passing through the recognition unit 25.

The drum-winding type temporary storage unit 24 feeds out the banknotes just as they were when stored. For example, the banknotes fed out from the temporary storage unit 24 are a plurality of overlapped banknotes or off-angled banknotes (see the upper part of FIG. 6). The recognition unit 25 cannot recognize those banknotes. Further, if a plurality of overlapped banknotes or off-angled banknotes are transported a longer way in order to pass through the recognition unit 25, the banknotes might jam together. The banknotes are transported from the temporary storage unit 24 to the dispensing unit 22 through the shortest path by bypassing the recognition unit 25, whereby advantageously the banknotes are less likely to jam together. Further, the amount of the banknotes as a group stored in the drum-winding type temporary storage unit 24 is secured although they are overlapped or off-angled (for example, three 1-dollar banknotes for the N-th group).

The banknotes transported to the dispensing unit 22 are held in the dispensing unit 22. The dispensing unit 22 is box-shaped, so if a plurality of overlapped banknotes or off-angled banknotes are transferred to the dispensing unit 22, the dispensing unit 22 can hold those banknotes.

As described above, the temporary storage unit 24 feeds out the banknotes group by group. The temporary storage unit 24 feeds out one group of banknotes or feeds out a plurality of groups of banknotes in sequence. Based on the information stored in the memory unit 27 (see FIG. 7), the controller 15 can recognize the denomination and number of banknotes fed out from the temporary storage unit 24 and transported to the dispensing unit 22. When all the banknotes to be dispensed are dispensed to the dispensing unit 22, the dispensing transaction ends.

If the rejected banknotes fed out from the temporary storage unit 24 are insufficient for the banknotes to be dispensed, the storage units 31 to 35 feed out the banknotes that compensate for the insufficiency as shown in the lower part of FIG. 8. The storage unit that stores the banknotes of which the denomination is insufficient feeds out the banknotes. In the example of FIG. 8, the third storage unit 33 feeds out the banknote. The banknotes fed out from the storage units 31 to 35 are transported to the dispensing unit 22 after passing through the recognition unit 25. The banknotes recognized as the rejected banknotes by the recognition unit are transported to the temporary storage unit 24.

If the temporary storage unit 24 and the storage units 31 to 35 feed out the banknotes whereby all the banknotes to be dispensed are dispensed to the dispensing unit 22, the dispensing transaction ends.

In FIG. 8, after the temporary storage unit 24 feeds out the banknotes, the storage units feed out the banknotes. Since it can be predicted that the rejected banknotes fed out from the temporary storage unit 24 alone will be insufficient for the banknotes to be dispensed, the storage units may feed out the banknotes that compensate for the insufficiency, and then the temporary storage unit 24 may feed out the rejected banknotes.

Here, as shown in FIG. 6, the temporary storage unit 24 feeds out the banknotes in the order in which they are stored. At the time the dispensing transaction starts, if the group of banknotes that the temporary storage unit 24 feeds out first is included in the denomination and number of the banknotes to be dispensed, the temporary storage unit 24 feeds out the rejected banknotes as the banknotes used for the dispensing transaction. The case "if the group of banknotes that the temporary storage unit 24 first feeds out is included in the denomination and number of the banknotes to be dispensed" means that, if the group of banknotes fed out first is transferred to the dispensing unit 22 as the banknotes used for the dispensing transaction, all or part of the banknotes to be dispensed are covered by the rejected banknotes. In other words, the banknote processing device 1 is not regarded as having dispensed excessive banknotes.

The temporary storage unit 24 also feeds out not only one group of banknotes fed out first but a plurality of groups of banknotes as long as those banknotes do not exceed the denomination and number of the banknotes to be dispensed. However, the plurality of groups need to be continuous from the group of banknotes fed out first. If a plurality of groups of banknotes are fed out from the temporary storage unit 24, it is possible to further reduce the number of banknotes stored in the temporary storage unit 24.

Further, if the amount of the group of banknotes fed out first from the temporary storage unit 24 is included in the amount of the banknotes to be dispensed, the temporary storage unit 24 may feed out the rejected banknotes as the banknotes used for the dispensing transaction. For example, if the amount of the banknotes to be dispensed is 15 dollars, the temporary storage unit 24 may dispense three 1-dollar banknotes if the group of banknotes fed out first includes three 1-dollar banknotes as illustrated in FIG. 7. Further, if the group of banknotes fed out next includes two 1-dollar banknotes and two 5-dollar banknotes, the temporary storage unit 24 may further feed out two 1-dollar banknotes and two 5-dollar banknotes. The banknote processing device 1 is not limited to dispensing the banknotes so that the number of banknotes to be dispensed is minimized in the dispensing transaction.

If the group of banknotes fed out first from the temporary storage unit 24 is not included in the denomination and number of banknotes to be dispensed, or is not included in the amount of money to be dispensed, that is, if the banknotes are dispensed excessively when the group of banknotes fed out first is dispensed to the dispensing unit 22, the controller 15 prohibits the temporary storage unit 24 from feeding out the rejected banknotes, and causes the storage units 31 to 35 instead of the temporary storage unit 24 to feed out the banknotes used for the dispensing transaction (see FIG. 4).

Figure 9:
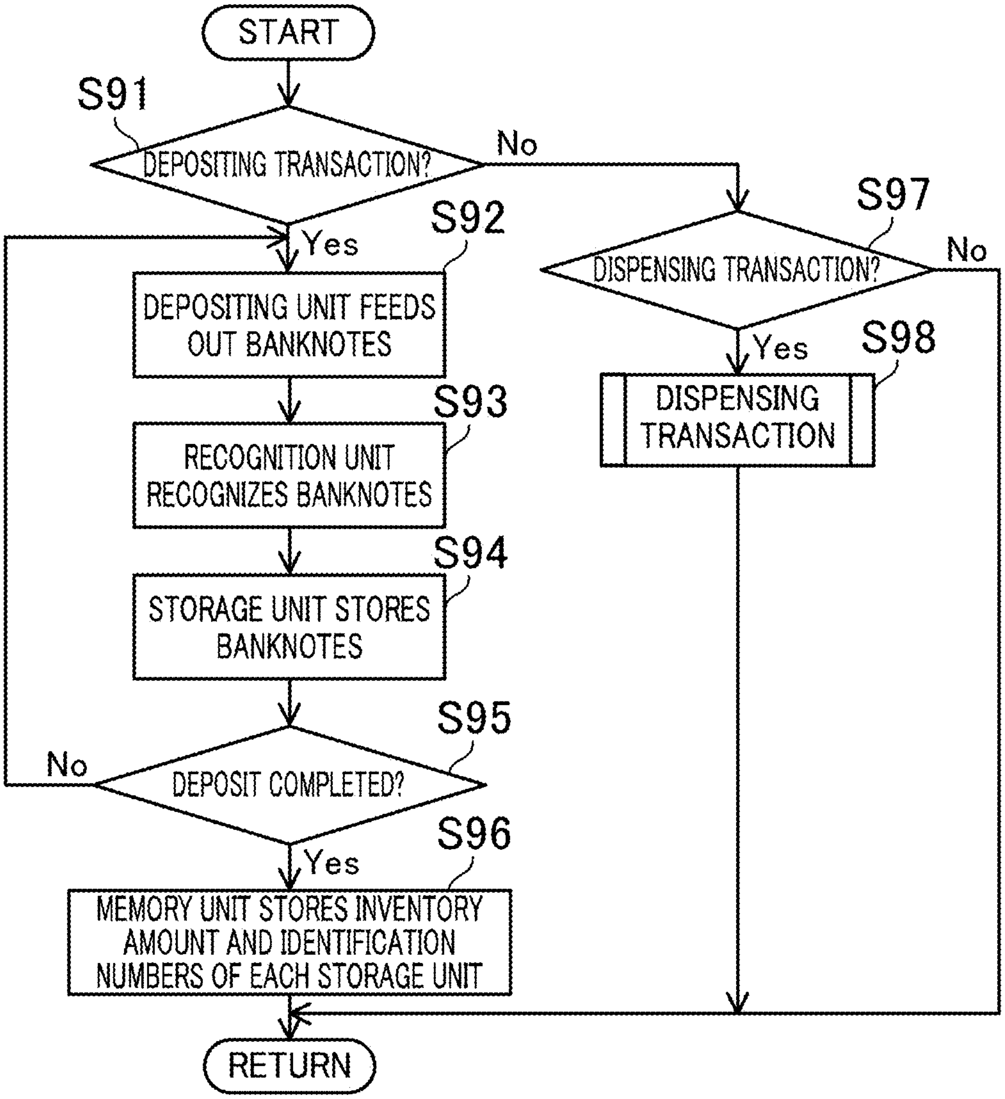
FIG. 9 is a flowchart of the depositing transaction and the dispensing transaction.
Figure 10:
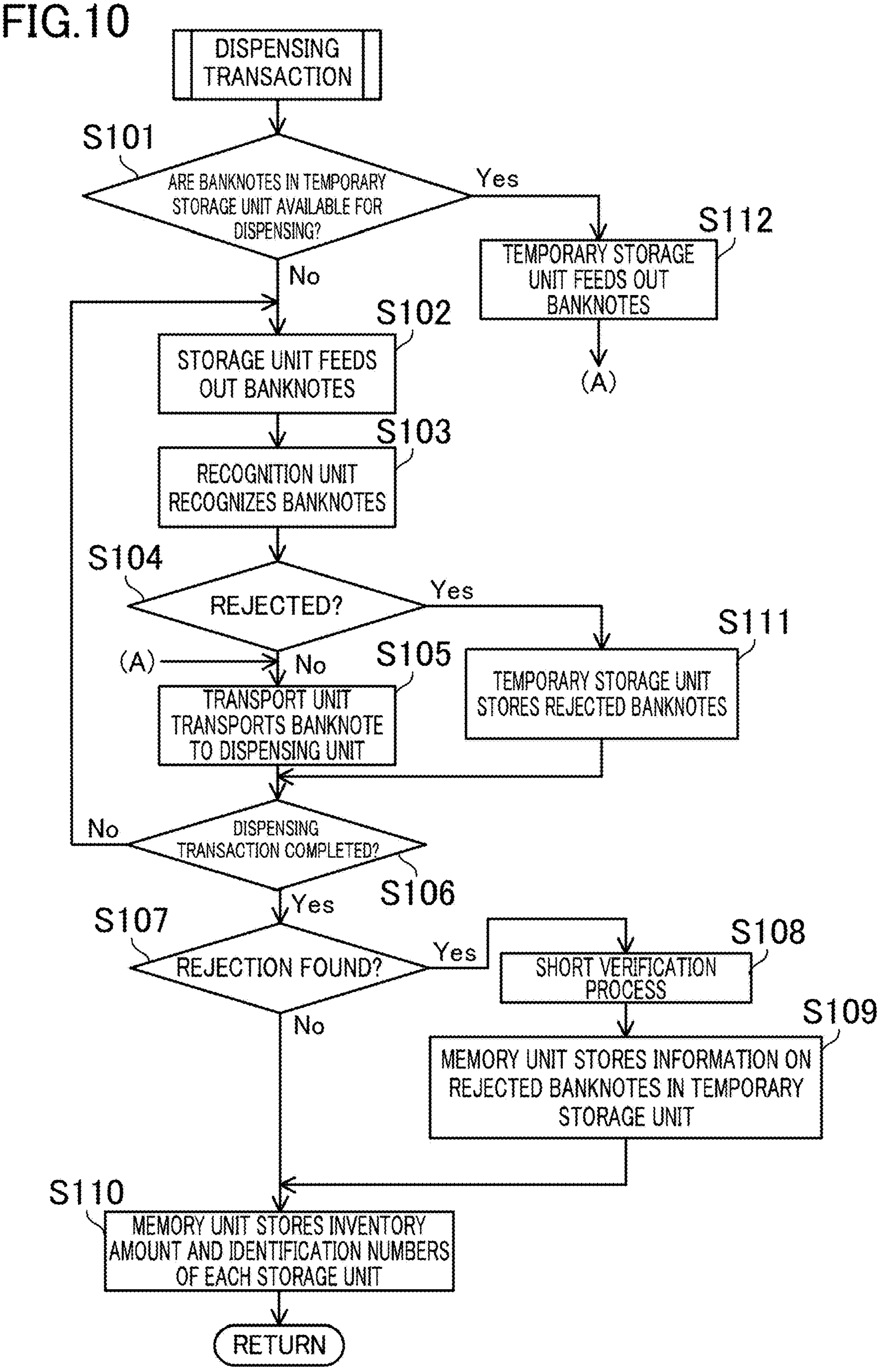
FIG. 10 is a flowchart of the dispensing transaction.

FIGS. 9 and 10 are flowcharts showing the control procedure for the depositing transaction and the dispensing transaction executed by the banknote processing device 1. In the flows of FIGS. 9 and 10, the steps may be switched, some of the steps may be omitted, or extra steps may be added within allowable ranges.

In step S91, the controller 15 determines whether an instruction to execute the depositing transaction is given based on the signal from the input unit 26.

If the determination in step S91 is YES, the banknote processing device 1 executes the depositing transaction in steps S92 to S96. First, in step S92, the depositing unit 21 feeds out the banknotes inserted into the depositing unit 21 to the upper housing 111. Then, in step S93, the recognition unit 25 recognizes the banknotes. The recognition unit 25 also reads the identification numbers of the banknotes. In step S94, the storage units 31 to 35 store the banknotes according to the recognition results.

In step S95, the controller 15 determines whether the depositing transaction is completed. If the determination in step S95 is NO, the process of FIG. 9 returns to step S92. The depositing unit 21 continues to feed out the banknotes. If the determination in step S95 is Yes, in step S96, the memory unit 27 stores the inventory amount of each of the storage units 31 to 35 and the identification numbers of the stored banknotes (see FIG. 5).

If the determination in step S91 is No, in step S97, the controller 15 determines whether an instruction to execute the dispensing transaction is given based on the signal from the input unit 26. If the determination in step S97 is NO, the process of FIG. 9 returns. If the determination in step S97 is YES, in step S98, the banknote processing device 1 executes the dispensing transaction. In step S98, the banknote processing device 1 executes the dispensing transaction basically based on the information on the denomination and number of banknotes to be dispensed (or the amount of banknotes to be dispensed) specified through the input unit 26.

The flowchart of FIG. 10 shows in detail the control steps of the dispensing transaction in step S98. First, in step S101, based on the information stored in the memory unit 27, the controller 15 compares the information on the banknotes to be dispensed that is specified through the input unit 26 with the information on each group of banknotes stored in the temporary storage unit 24. The information on the banknotes to be dispensed is the information on the denomination and number of banknotes, or the amount of banknotes to be dispensed. The information on each group of banknotes stored in the temporary storage unit 24 is the denomination and number of banknotes, or the amount of banknotes. That is, the controller 15 determines whether the rejected banknotes stored in the temporary storage unit 24 can be used as the banknotes used for the dispensing transaction. As described above, if the rejected banknotes are stored in the temporary storage unit 24, and the group of banknotes fed out first from the temporary storage unit 24 is included in the denomination and number of banknotes to be dispensed, or included in the amount of banknotes to be dispensed, the determination in step S101 is YES; otherwise, the determination in step S101 is NO. In addition, in step S101, the controller 15 determines the denomination and number of banknotes fed out from the storage unit.

If the determination in step S101 is No, in step S102, the storage units 31 to 35 feed out the banknotes, and in step S103, the recognition unit 25 recognizes the banknotes. In step S104, the controller 15 determines whether the recognition unit 25 recognizes the banknotes as the rejected banknotes. If the determination in step S104 is YES, in step S111, the temporary storage unit 24 stores the rejected banknotes. If the determination in step S104 is NO, in step 105, the transport unit 4 transports the banknotes to the dispensing unit 22.

In step S106, the controller 15 determines whether all the banknotes to be dispensed have been transferred to the dispensing unit 22. If the determination in step S106 is No, the process of FIG. 10 returns to step S102. The storage units 31 to 35 continue to feed out the banknotes.

On the other hand, if the determination in step S101 is YES, in step S112, the temporary storage unit 24 feeds out the rejected banknotes. The temporary storage unit 24 can feed out one group or a plurality of groups of banknotes. The banknotes fed out from the temporary storage unit 24 are transported to the dispensing unit 22 in step S105.

After step S112, the process of FIG. 10 proceeds to step S106 via step S105. If the rejected banknotes fed out from the temporary storage unit 24 alone are insufficient for the banknotes to be dispensed, the process of FIG. 10 returns from step S106 to step S102. In step S102, the storage units 31 to 35 feed out the banknotes that compensate for the insufficiency. The denomination and number of banknotes to be fed out from the storage units 31 to 35 as the banknotes that compensate for the insufficiency are confirmed in step S101.

If all the banknotes to be dispensed are dispensed to the dispensing unit 22, the determination in step S106 is Yes. In step S107 after step S106, the controller 15 determines whether a rejected banknote occurred in the dispensing transaction. If the determination in step S107 is No, in step S110, the memory unit 27 stores the inventory amount of each of the storage units 31 to 35 after the dispensing transaction ends and the identification numbers of the stored banknotes (see FIG. 5).

If the determination in step S107 is YES, in step S108, the controller 15 executes the short verification process for the storage unit that fed out the rejected banknotes. The inventory amount of the storage unit is confirmed. In the subsequent step S109, based on the confirmed inventory amount of the storage unit, the memory unit 27 stores the denomination and number of the rejected banknotes stored in the temporary storage unit 24 in step S111 (see FIG. 7). Then, in step S110, the memory unit 27 stores the inventory amount of each of the storage units 31 to after the dispensing transaction ends and the identification numbers of the stored banknotes (see FIG. 5).

The banknote processing device 1 can reduce the number of banknotes stored in the temporary storage unit 24 because the temporary storage unit 24 feeds out the rejected banknotes as the banknotes used for the dispensing transaction. The temporary storage unit 24 is less likely to become full of banknotes. The person in charge collects the banknotes less frequently from the temporary storage unit 24, and thus it is possible to conduct smooth operation of the banknote processing device 1.

The banknote processing device 1 can omit the short verification process after the dispensing transaction. That is, the banknote fed out last from the storage units 31 to 35 in the dispensing transaction corresponds to the banknote not recognized as the rejected banknote and fed out to the outlet 221. This is because if a rejected banknote occurs, a banknote that replaces the rejected banknote is fed out from the storage units 31 to 35 thereafter.

The controller 15 can confirm the inventory amount of the storage unit after the dispensing transaction by matching the identification number of the banknote fed out last from the storage unit that fed out the rejected banknote with the identification number list 270 stored in the memory unit 27. If the inventory amount of the storage unit after the dispensing transaction can be confirmed, the controller 15 can confirm the number of the rejected banknotes stored in the temporary storage unit 24 in the dispensing transaction as described above. After the dispensing transaction, the storage units can omit feeding out extra banknotes for the short verification process.

Figure 11:
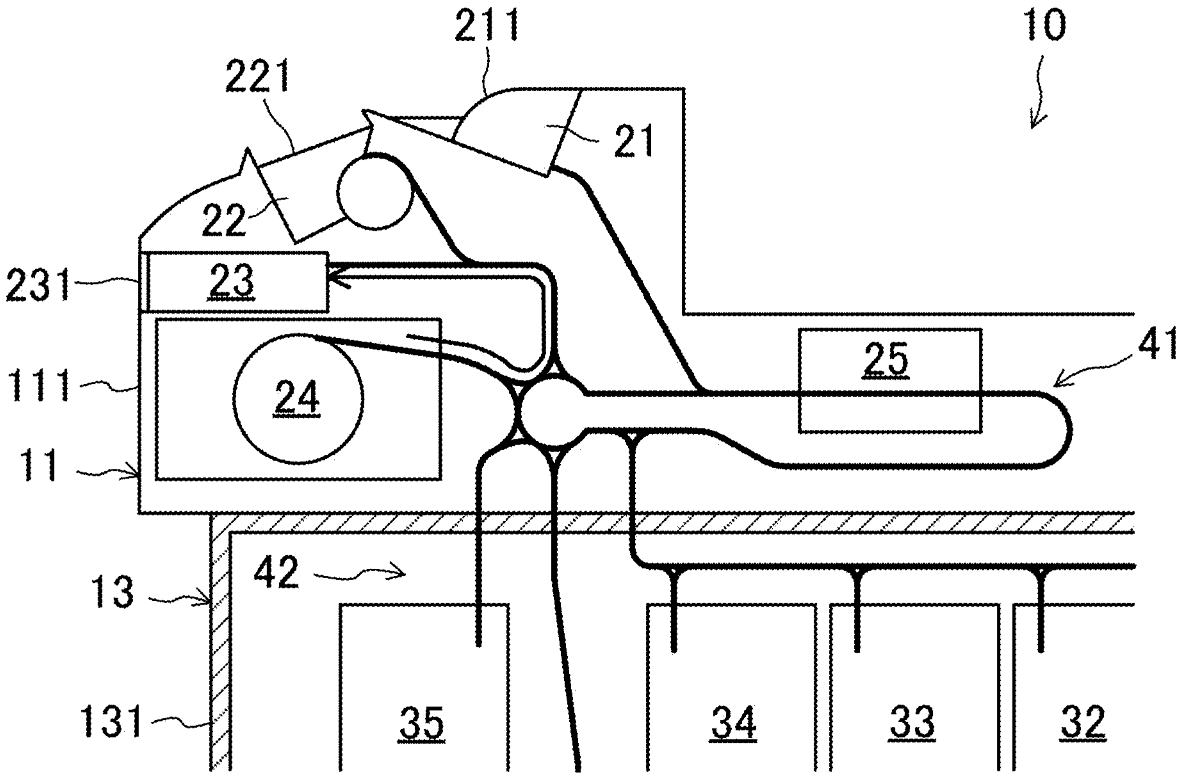
FIG. 11 shows the transport route of the rejected banknotes in a banknote processing device having a rejected banknote storage unit.

FIG. 11 illustrates a variation of the banknote processing device. The banknote processing device 10 includes a rejected banknote storage unit 23. The rejected banknote storage unit 23 stores the rejected banknotes. The rejected banknote storage unit 23 is located near the temporary storage unit 24 in the upper housing 111. The rejected banknote storage unit 23 is connected to a transport path that branches from the transport path connected with the dispensing unit 22. The rejected banknote storage unit 23 is connected to the looped transport path. The position of the rejected banknote storage unit 23 is not limited to the position shown in FIG. 11.

The rejected banknote storage unit 23 includes an opening 231. The inside of the rejected banknote storage unit 23 is open to the outside of the upper housing 111 through the opening 231. The opening 231 can be opened and closed. By opening the opening 231, the person in charge can collect the rejected banknotes stored in the rejected banknote storage unit 23 through the opening 231. Since it is not necessary to open the door of the safe housing 131 in order to collect the rejected banknotes, the person in charge does not need to have a special authorization to open the door of the safe housing 131.

If the number of stored banknotes exceeds a predetermined amount, the temporary storage unit 24 feeds out part or all of the stored banknotes. The predetermined amount may be set to an amount less than or equal to the amount at which the temporary storage unit 24 becomes full of banknotes. As indicated by the arrow in FIG. 11, the transport unit 4 transports the banknotes fed out from the temporary storage unit 24 to the rejected banknote storage unit 23, and the rejected banknote storage unit 23 stores the banknotes. The banknote processing device 10 may transfer banknotes from the temporary storage unit 24 to the rejected banknote storage unit 23 when being on standby where the depositing transaction and the dispensing transaction are not conducted. Since the rejected banknotes stored in the temporary storage unit 24 are not only used as the banknotes used for the dispensing transaction but transferred to the rejected banknote storage unit 23, the temporary storage unit 24 is further less likely to become full of banknotes. If both the rejected banknote storage unit 23 and the temporary storage unit 24 become full of banknotes, the banknote processing device 10 shuts down.

The banknote processing device 10 executes the depositing transaction and the dispensing transaction in accordance with the flowcharts of FIG. 9 and FIG. 10.

In the variation, the rejected banknotes stored in the temporary storage unit 24 are transported to the dispensing unit 22 in the dispensing transaction if the predetermined condition is satisfied, but still stored in the temporary storage unit 24 if the predetermined condition is not satisfied. Under such circumstances, the rejected banknotes stored in the temporary storage unit 24 are transferred to the rejected banknote storage unit 23, which prevents the temporary storage unit 24 from becoming full of banknotes and enables the banknote processing device 10 to operate continuously.

The technique disclosed herein is not limited to the application to the banknote processing device 1 or 10 shown in FIG. 1 or FIG. 11. The technique disclosed herein is applicable to banknote processing devices with various structures.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A method for controlling a banknote processing device, the method comprising:

in dispensing transaction, feeding out, by a storage, banknotes used for the dispensing transaction;

recognizing, by a recognition circuit, the banknotes fed out from the storage;

transporting, by a conveyor, banknotes recognized as non-rejected banknotes by the recognition circuit to an outlet, and transporting banknotes recognized as rejected banknotes by the recognition circuit to a temporary storage;

storing, by the temporary storage, the rejected banknotes;

in a case where the temporary storage stores the rejected banknotes, in the dispensing transaction, feeding out, by the temporary storage, the rejected banknotes as banknotes used for the dispensing transaction; and transporting, by the conveyor, the banknotes fed out from the temporary storage to the outlet, wherein in a case where an amount of the rejected banknotes stored is included in an amount of banknotes to be dispensed, the temporary storage feeds out the rejected banknotes as banknotes used for the dispensing transaction.

2. The method of claim 1, wherein in a case where a denomination and number of the rejected banknotes stored are included in a denomination and number of the banknotes to be dispensed, the temporary storage feeds out the rejected banknotes as banknotes used for the dispensing transaction.

3. The method of claim 1, wherein in a case where an amount of the rejected banknotes stored is not included in an amount of banknotes to be dispensed, the temporary storage does not feed out the rejected banknotes, and the storage instead of the temporary storage feeds out the stored banknotes as banknotes used for the dispensing transaction.

4. The method of claim 1, wherein in a case where an amount of the rejected banknotes stored in the temporary storage is insufficient for an amount of banknotes to be dispensed, the storage feeds out banknotes that compensate for insufficiency.

5. The method of claim 1, wherein the temporary storage distinguishes and stores the rejected banknotes for each dispensing transaction and feeds out the rejected banknotes for each dispensing transaction.

6. The method of claim 5, wherein the temporary storage feeds out the rejected banknotes as banknotes used for the dispensing transaction in a case where an amount of the rejected banknotes stored in one dispensing transaction or an amount of the rejected banknotes stored over a plurality of dispensing transactions is included in an amount of banknotes to be dispensed.

7. The method of claim 5, wherein the temporary storage is a drum-winding type storage and winds the rejected banknotes around the drum at intervals for each dispensing transaction.

8. The method of claim 1, further comprising:
storing, by a memory, identification numbers of the banknotes stored in the storage;
in a case where a rejected banknote occurs, after the dispensing transaction, feeding out, by the storage, part of the banknotes;
reading, by the recognition circuit, the identification numbers of the banknotes fed out from the storage;
confirming, by a controller, an inventory amount of the storage based on the denomination and number of the banknotes by matching the identification numbers read by the recognition circuit with the identification numbers stored in the memory; and
confirming, by the controller, the number of the rejected banknotes stored in the temporary storage in the dispensing transaction based on the number of banknotes transferred to the outlet in the dispensing transaction and the inventory amount of the storage confirmed after the dispensing transaction.

9. The method of claim 8, further comprising:
storing, by the memory, the denomination and number of the rejected banknotes stored in the temporary storage for each dispensing transaction.

10. The method of claim 1, further comprising:
storing, by a memory, identification numbers of the banknotes stored in the storage;
in the dispensing transaction, reading, by the recognition circuit, the identification numbers of the banknotes fed out from the storage and used for the dispensing transaction;
in a case where a rejected banknote occurs, confirming, by a controller, an inventory amount of the storage based on the number of the banknotes after the dispensing transaction by matching the identification number of the banknote fed out last from the storage in the dispensing transaction with the identification number stored in the memory; and
confirming, by the controller, the number of the rejected banknotes stored in the temporary storage in the dispensing transaction based on the number of banknotes transferred to the outlet in the dispensing transaction and the inventory amount of the storage confirmed after the dispensing transaction.

11. The method of claim 10, further comprising:
storing, by the memory, the denomination and number of the rejected banknotes stored in the temporary storage for each dispensing transaction.

12. The method of claim 1, further comprising:
in depositing transaction, feeding, by a depositing mechanism, the banknotes into the banknote processing device;
recognizing, by the recognition circuit, the banknotes fed from the depositing mechanism;
transporting, by the conveyor, the banknotes recognized by the recognition circuit to the storage without the banknotes passing through the temporary storage;
storing, by the storage, the banknotes; and
in the dispensing transaction, transporting, by the conveyor, the banknotes recognized as the rejected banknotes by the recognition circuit to the temporary storage.

13. A banknote processing device, comprising:
a conveyor transporting banknotes along a transport path;
a storage connected to the transport path and feeding out banknotes stored therein in dispensing transaction to the transport path as the banknotes used for the dispensing transaction;
a recognition circuit connected to the transport path and recognizing the banknotes fed out from the storage; and
a temporary storage connected to the transport path and storing and feeding out the banknotes, wherein
in the dispensing transaction, the conveyor transports banknotes recognized as non-rejected banknotes by the recognition circuit to an outlet, and transports banknotes recognized as rejected banknotes by the recognition circuit to the temporary storage,
the temporary storage stores the rejected banknotes,
in a case where the temporary storage stores the rejected banknotes, in the dispensing transaction, the temporary storage feeds out the rejected banknotes to the transport path as banknotes used for the dispensing transaction, and
the conveyor transports the banknotes fed out from the temporary storage to the outlet, wherein
in a case where an amount of the rejected banknotes stored is included in an amount of banknotes to be dispensed, the temporary storage feeds out the rejected banknotes as banknotes used for the dispensing transaction.

* * * * *